(12) United States Patent
Coenegracht et al.

(10) Patent No.: US 9,948,082 B2
(45) Date of Patent: Apr. 17, 2018

(54) CABLE SEALING UNIT WITH MULTIPLE SEALING MODULES

(71) Applicant: Tyco Electronics Raychem BVBA, Kessel-Lo (BE)

(72) Inventors: Philippe Coenegracht, Hasselt (BE); Mohamed Aznag, Scherpenheuvel (BE); Paul Joseph Claes, Tremelo (BE); Dirk Jozef G. Van De Weyer, Beringen (BE); Maarten Michiels, Herent (BE); Diederik Houben, Berbroek (BE); Pieter Doultremont, Kermt-Hasselt (BE); Eddy Maes, Maasmechelen (BE); Geert Van Genechten, Vorselaar (BE); Maddy Nadine Frederickx, Aarschot (BE); Emilie De Groe, Kessel-Lo (BE)

(73) Assignee: COMMSCOPE CONNECTIVITY BELGIUM BVBA (BE)

( * ) Notice: Subject to any disclaimer, the term of this patent is extended or adjusted under 35 U.S.C. 154(b) by 760 days.

(21) Appl. No.: 14/412,381

(22) PCT Filed: Jun. 27, 2013

(86) PCT No.: PCT/EP2013/063486
§ 371 (c)(1),
(2) Date: Dec. 31, 2014

(87) PCT Pub. No.: WO2014/005916
PCT Pub. Date: Jan. 9, 2014

(65) Prior Publication Data
US 2015/0137461 A1    May 21, 2015

Related U.S. Application Data

(60) Provisional application No. 61/667,326, filed on Jul. 2, 2012, provisional application No. 61/766,523, filed on Feb. 19, 2013.

(51) Int. Cl.
*H02G 15/00* (2006.01)
*H02G 15/04* (2006.01)
(Continued)

(52) U.S. Cl.
CPC .............. *H02G 15/04* (2013.01); *F16J 15/06* (2013.01); *F16J 15/104* (2013.01);
(Continued)

(58) Field of Classification Search
CPC ........ H02G 15/013; H02G 3/22; H02G 15/04; H02G 15/08; H02G 15/10; G02B 6/4444; G02B 6/4439; F16J 15/104; F16J 15/06
(Continued)

(56) References Cited

U.S. PATENT DOCUMENTS

| 4,572,923 A | 2/1986 | Castellani et al. |
| 5,313,019 A | 5/1994 | Brusselmans et al. |

(Continued)

FOREIGN PATENT DOCUMENTS

| DE | 30 25 766 | 1/1982 |
| DE | 31 29 489 | 2/1983 |

(Continued)

OTHER PUBLICATIONS

International Search Report for International Application No. PCT/EP2013/063495 dated Feb. 6, 2014 (5 pages).

(Continued)

*Primary Examiner* — Angel R Estrada
(74) *Attorney, Agent, or Firm* — Merchant & Gould P.C.

(57) ABSTRACT

A sealing unit (28) that fits within the sealing unit opening (26) of a housing 22. The sealing unit (28) including a sealant arrangement (32) that define a plurality of cable ports (30). The sealing arrangement is also configured for providing a peripheral seal between the housing (22) and the sealing unit (28). The sealing unit (28) includes an actuation
(Continued)

arrangement (31) for pressurizing the sealant arrangement (32) within the sealing unit opening (26). The sealant arrangement (32) includes a plurality of sealing modules (33a-33e) each sized to form only a portion of the pressure actuated sealant arrangement (32).

35 Claims, 23 Drawing Sheets

(51) Int. Cl.
 *F16J 15/10* (2006.01)
 *G02B 6/44* (2006.01)
 *H02G 15/013* (2006.01)
 *F16J 15/06* (2006.01)
 *H02G 3/22* (2006.01)

(52) U.S. Cl.
 CPC ......... *G02B 6/4444* (2013.01); *H02G 15/013* (2013.01); *H02G 3/22* (2013.01)

(58) Field of Classification Search
 USPC ........ 174/18, 17 R, 50, 520, 650, 652, 77 R; 277/590, 602, 626
 See application file for complete search history.

(56) References Cited

U.S. PATENT DOCUMENTS

| | | | |
|---|---|---|---|
| 5,446,823 | A | 8/1995 | Bingham et al. |
| 5,455,391 | A | 10/1995 | Demesmaeker |
| 5,630,419 | A | 5/1997 | Ranalletta |
| 5,756,972 | A | 5/1998 | Vranicar |
| 5,764,844 | A | 6/1998 | Mendes |
| 5,774,618 | A | 6/1998 | Jones |
| 5,775,702 | A | 7/1998 | Laeremans et al. |
| 6,046,406 | A | 4/2000 | Milanowski et al. |
| 6,088,886 | A | 7/2000 | Gyöngyösi |
| 6,100,472 | A | 8/2000 | Foss |
| 7,038,137 | B2 | 5/2006 | Grubish et al. |
| 8,604,360 | B2 | 12/2013 | Knorr et al. |
| 9,151,413 | B2 | 10/2015 | Marold |
| 9,394,442 | B2 | 7/2016 | Adams |
| 9,502,878 | B2 | 11/2016 | Coenegracht |
| 2002/0146229 | A1 | 10/2002 | Roberts |
| 2003/0156798 | A1 | 8/2003 | Cull |
| 2004/0080119 | A1 | 4/2004 | Goll |
| 2004/0100028 | A1 | 5/2004 | Desard et al. |
| 2006/0063418 | A1 | 3/2006 | Motzigkeit |
| 2009/0304341 | A1 | 12/2009 | Shimirak et al. |
| 2009/0309313 | A1 | 12/2009 | Knorr et al. |
| 2013/0014974 | A1 | 1/2013 | Burke et al. |
| 2013/0020771 | A1 | 1/2013 | Vanhentenrijk et al. |
| 2013/0320631 | A1 | 12/2013 | Vastmans et al. |
| 2014/0041893 | A1 | 2/2014 | Adams et al. |
| 2014/0072266 | A1 | 3/2014 | Vastmans et al. |
| 2015/0155696 | A1 | 6/2015 | Coenegracht et al. |
| 2015/0168664 | A1 | 6/2015 | Coenegracht et al. |
| 2015/0357809 | A1 | 12/2015 | Coengracht |
| 2016/0320580 | A1 | 11/2016 | Cornelisson et al. |

FOREIGN PATENT DOCUMENTS

| | | |
|---|---|---|
| DE | 33 22 809 | 1/1985 |
| DE | 20 2006 006 019 | 7/2006 |
| DE | 20 2011 003 754 | 8/2012 |
| DE | 10 2012 112 510 A1 | 6/2014 |
| EP | 0 442 941 | 1/1995 |
| EP | 0 638 976 | 2/1995 |
| EP | 0 652 619 | 5/1995 |
| EP | 0 587 616 | 7/1996 |
| EP | 0 426 658 | 11/1996 |
| EP | 0 681 598 | 9/1997 |
| EP | 0 841 734 | 5/1998 |
| EP | 1 710 882 | 10/2006 |
| EP | 2 330 706 | 6/2011 |
| WO | WO 95/24756 | 9/1995 |
| WO | WO 96/32660 A1 | 10/1996 |
| WO | WO 96/62660 | 10/1996 |
| WO | WO 97/42693 | 11/1997 |
| WO | WO 99/56370 | 11/1999 |
| WO | WO 01/28057 | 4/2001 |
| WO | WO 02/33796 | 4/2002 |
| WO | WO 02/063736 | 8/2002 |
| WO | WO 02/097488 | 12/2002 |
| WO | WO 2005/027290 | 3/2005 |
| WO | WO 2006/118747 | 11/2006 |
| WO | WO 2007/118548 | 10/2007 |
| WO | WO 2007/137717 | 12/2007 |
| WO | WO 2008/112118 | 9/2008 |
| WO | WO 2009/148604 | 12/2009 |
| WO | WO 2011/067190 | 6/2011 |
| WO | WO 2012/152789 | 11/2012 |
| WO | 2013/000821 A2 | 1/2013 |
| WO | WO 2014/095462 | 6/2014 |

OTHER PUBLICATIONS

International Search Report for International Application No. PCT/EP2013/063497 dated Feb. 6, 2014 (6 pages).
International Search Report for International Application No. PCT/EP2013/063500 dated Feb. 6, 2014 (7 pages).
Extended European Search Report for corresponding European Patent Application No. 17151464.9 dated Jul. 26, 2017, 9 pages
International Search Report for International Application No. PCT/EP2013/063486 dated Feb. 6, 2014 (6 pages).

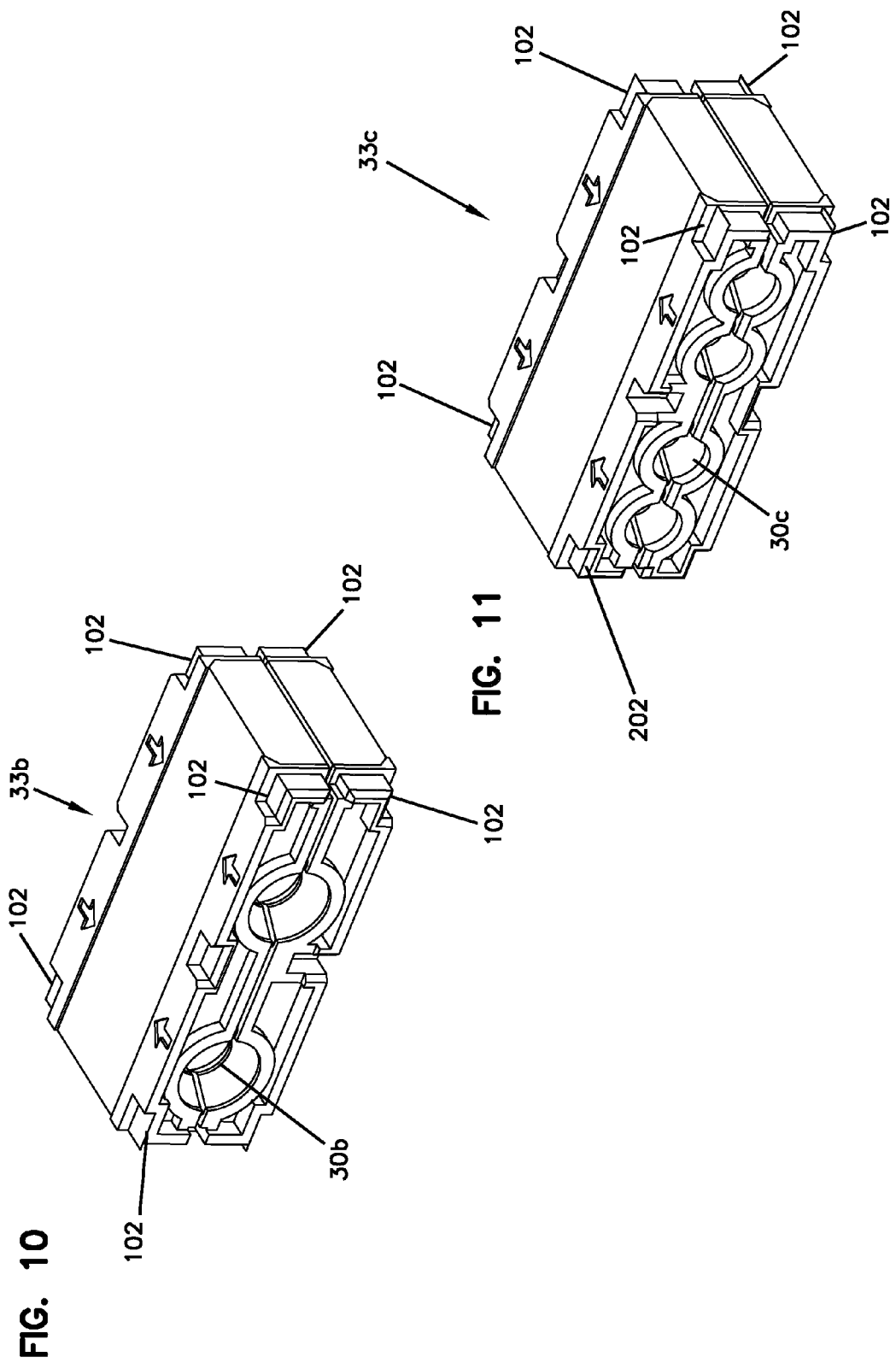

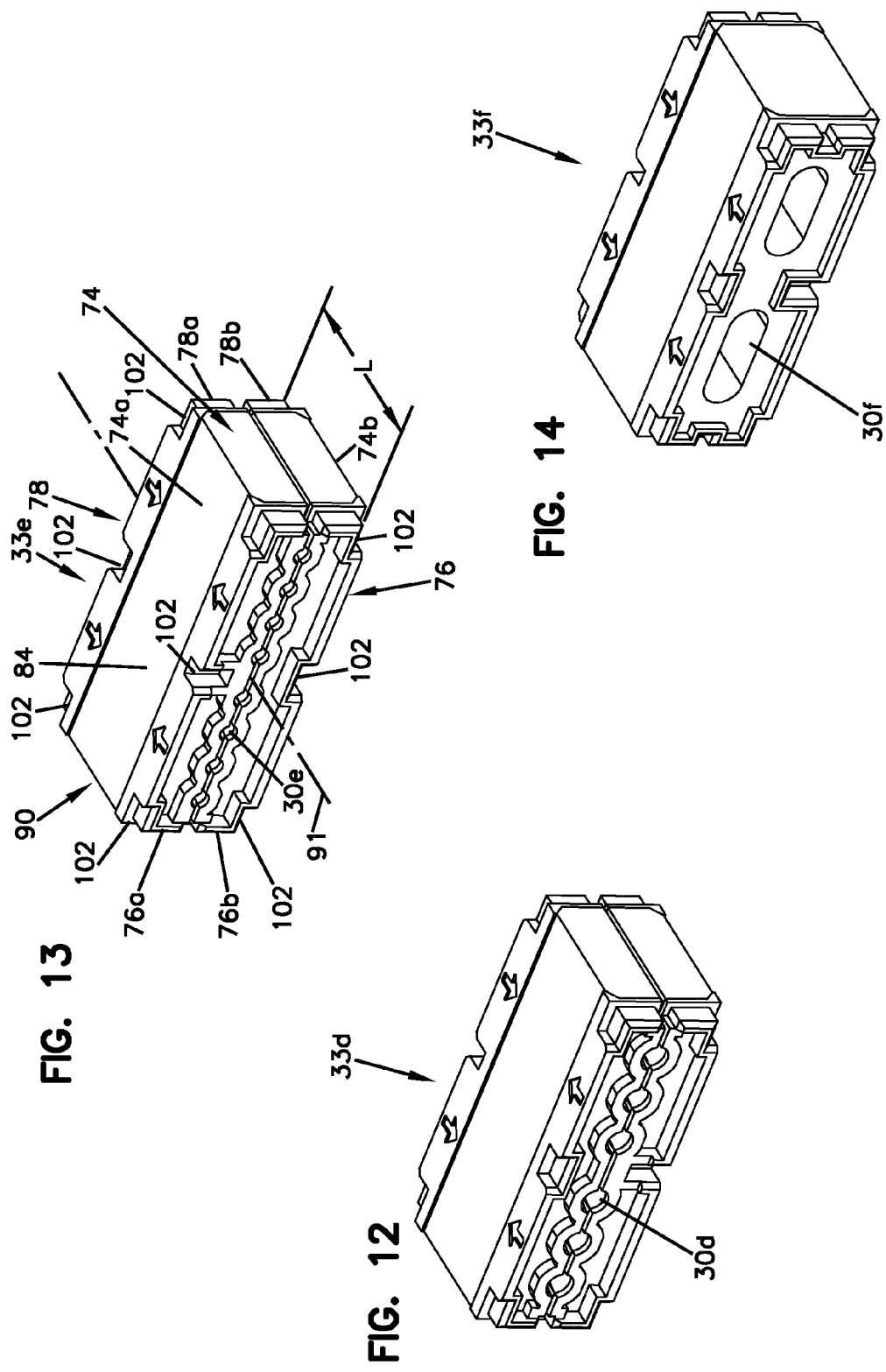

CABLE SEALING UNIT WITH MULTIPLE SEALING MODULES

This application is a National Stage Application of PCT/EP2013/063486, filed 27 Jun. 2013, which claims benefit of U.S. Provisional Ser. No. 61/667,326, filed 2 Jul. 2012 and U.S. Provisional Ser. No. 61/766,523, filed 19 Feb. 2013 and which applications are incorporated herein by reference. To the extent appropriate, a claim of priority is made to each of the above disclosed applications.

TECHNICAL FIELD

The present disclosure relates generally to techniques for sealing cable entry points of enclosures within telecommunications systems.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers. It is often preferred for the telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures. Telecommunications enclosures are typically sealed to inhibit the intrusion of moisture or other contaminants. Pressurized gel-type seals have been used to effectively seal the locations where telecommunications cables enter and exit telecommunications enclosures. Example pressurized gel-type seals are disclosed by document EP 0442941 B1 and document EP 0587616 B1. Both of these documents disclose gel-type cable seals that are pressurized through the use of threaded actuators. Document U.S. Pat. No. 6,046,406 discloses a cable seal that is pressurized through the use of an actuator including a cam lever. While pressurized cable seals have generally proven to be effective, improvements in this area are still needed.

SUMMARY

Aspects of the present disclosure allow a pressure actuated cable sealing unit to be readily adapted in the field or at the factory so as to accommodate cables of different numbers and sizes. In certain embodiments, the sealing unit can include a plurality of separately identifiable sealing modules that can be independently installed in and independently removed from the sealing unit. In certain embodiments, the design is cost effective and efficient since the sealing unit does not need to use separate actuation arrangement for separately pressurizing each sealing module, but instead all the cable sealing modules can be concurrently pressurized using the same actuation arrangement. In certain embodiments, the sealing modules can have a longer axial cable gel bonding/sealing lengths inside the modules as compared to axial bonding/sealing length at peripheries of the cable sealing modules. This is advantageous because cables often have scratches or inconsistencies at their outer surfaces caused by manipulation and handling during installation. Thus, the longer gel sealing length at the cable to insert interface helps insure that an adequate seal is provided around the cable. The peripheries of the cable sealing modules typically will contact gel of adjacent cable sealing modules or the interior surface of a housing opening receiving the sealing unit and therefore can provide an adequate seal with a shorter gel sealing length than the length of gel sealing surface required to insure an adequate seal about a cable. By varying the lengths of the inside and outside sealing surfaces of the cable sealing modules, the overall amount of sealant utilized in the modules can be conserved and modules can each have a compact, cost effective design.

One aspect of the present disclosure relates to an enclosure including a housing defining a housing opening that extends along an opening central axis. The enclosure further includes a sealing unit that can be inserted along the opening central axis into the housing opening. The sealing unit may include a sealant ring that surrounds the opening central axis when the sealing unit is positioned within the opening. The sealing unit may include an actuation arrangement that can have an inner and outer axial pressurization structures between which the sealant ring may be axially pressurized. The sealant ring may form an outer radial seal with an interior surface of the housing that defines the housing opening. The sealant ring may form an inner radial seal with an outward axial extension of the inner pressurization structure. The actuation arrangement may also include an actuator that can be accessible from outside the housing. The actuator may include an actuator shaft that couples to the outward axial extension of the inner pressurization structure.

Another aspect of the present disclosure relates to a sealing unit including a sealant ring and inner and outer axial pressurization structures for pressurizing the sealant ring. The sealing unit may further include an actuator for forcing the inner and outer axial pressurization structures together to pressurize the sealant ring. The actuator may include a threaded shaft and a handle assembly that threads on the threaded shaft to press the inner and outer pressurization structures together. The handle assembly may include a handle that is universally pivotally movable relative to the threaded shaft.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventions and inventive concepts upon which the embodiments disclosed herein are based.

BRIEF DESCRIPTION OF THE DRAWINGS

FIG. 10 shows a two port cable sealing module of the cable sealing unit of FIGS. 3 and 4;

FIG. 11 shows a four port cable sealing module of the cable sealing unit of FIGS. 3 and 4;

FIG. 12 shows a six port cable sealing module of the cable sealing unit of FIGS. 3 and 4;

FIG. 13 shows an eight port cable sealing module of the cable sealing unit of FIGS. 3 and 4;

FIG. 14 shows a two port cable sealing module of the cable sealing unit of FIGS. 3 and 4 where the ports are configured for receiving and sealing flat drop cables;

DETAILED DESCRIPTION

Figure 1:
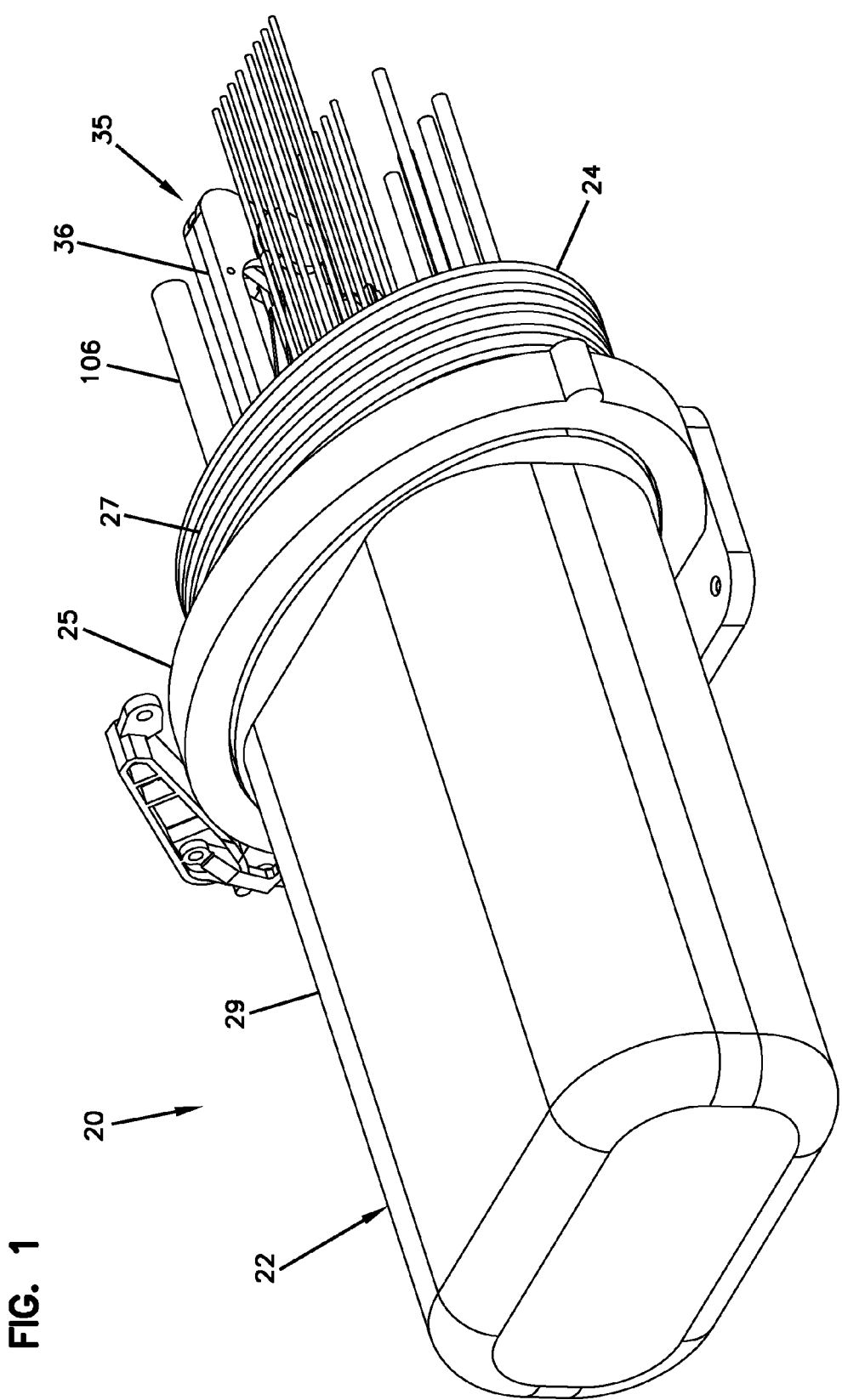
FIG. 1 is a perspective view of a telecommunications enclosure in accordance with the principles of the present disclosure, the enclosure has a dome-style cover and a based secured together by a clamp.
Figure 2:
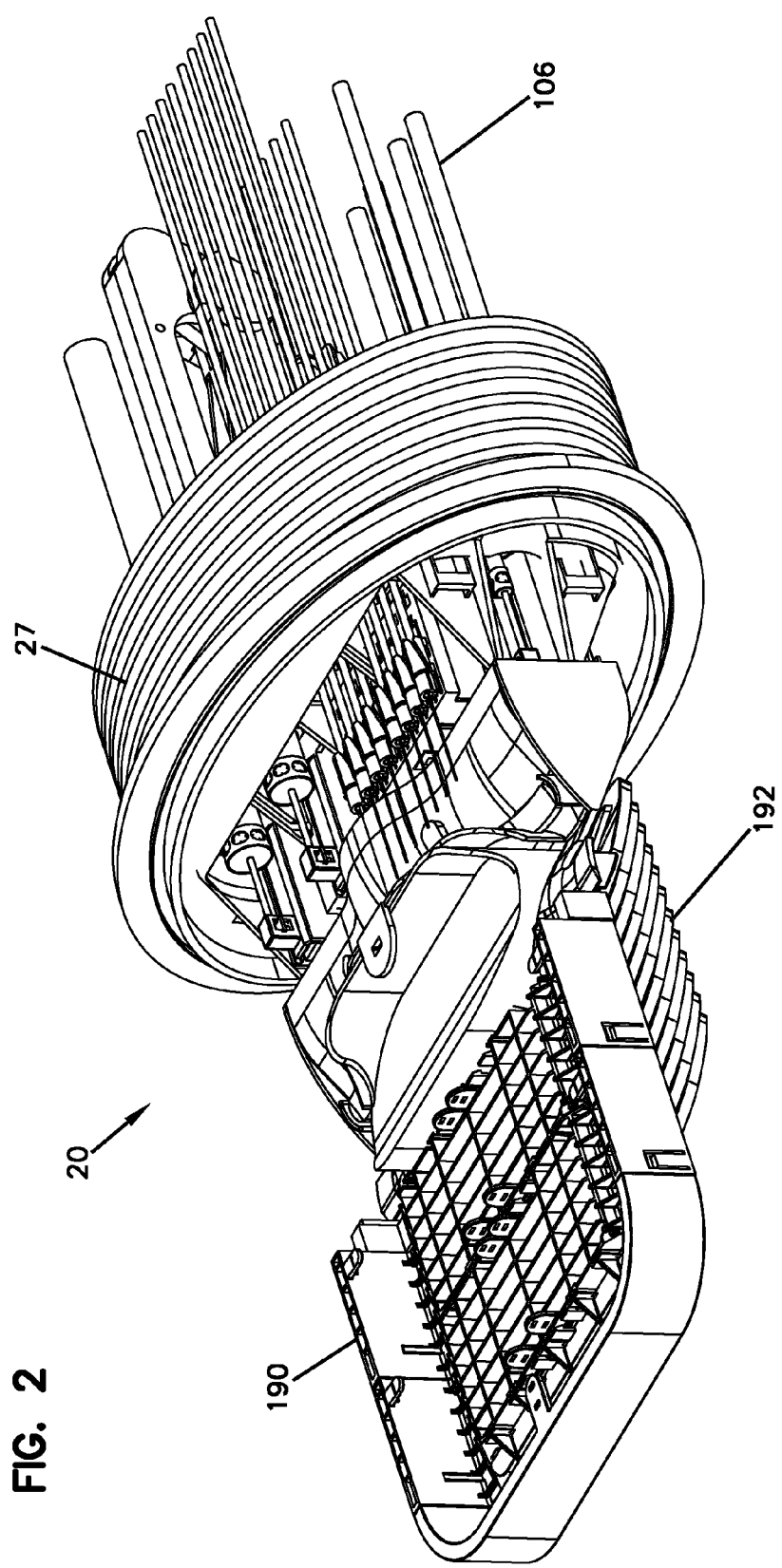
FIG. 2 shows the telecommunications enclosure of FIG. 1 with the dome-style cover of the enclosure removed from the base of the enclosure.
Figure 3:
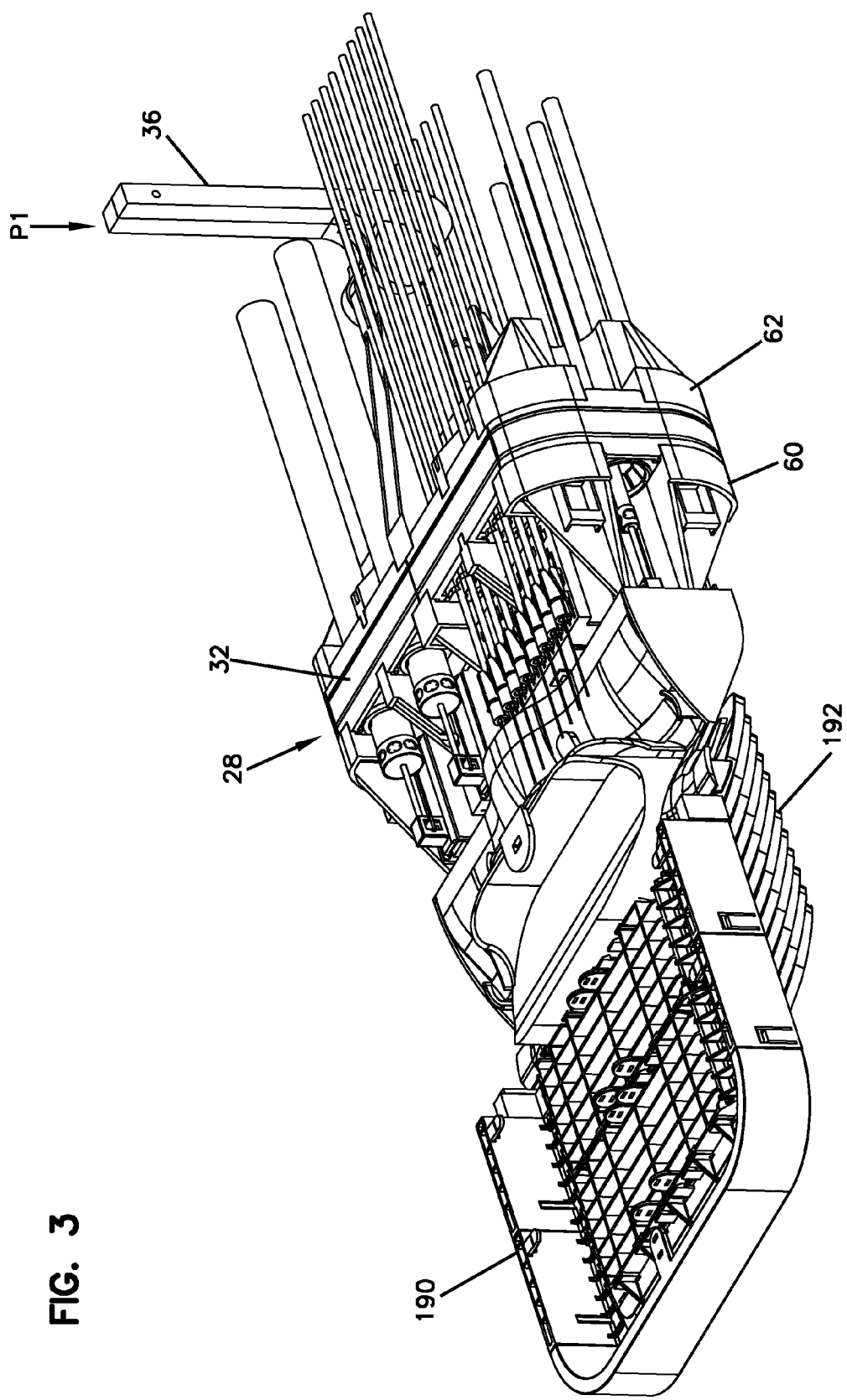
FIG. 3 shows a frame and a sealing unit of the enclosure of FIGS. 1 and 2, the sealing unit is shown in a non-actuated position.
Figure 16:
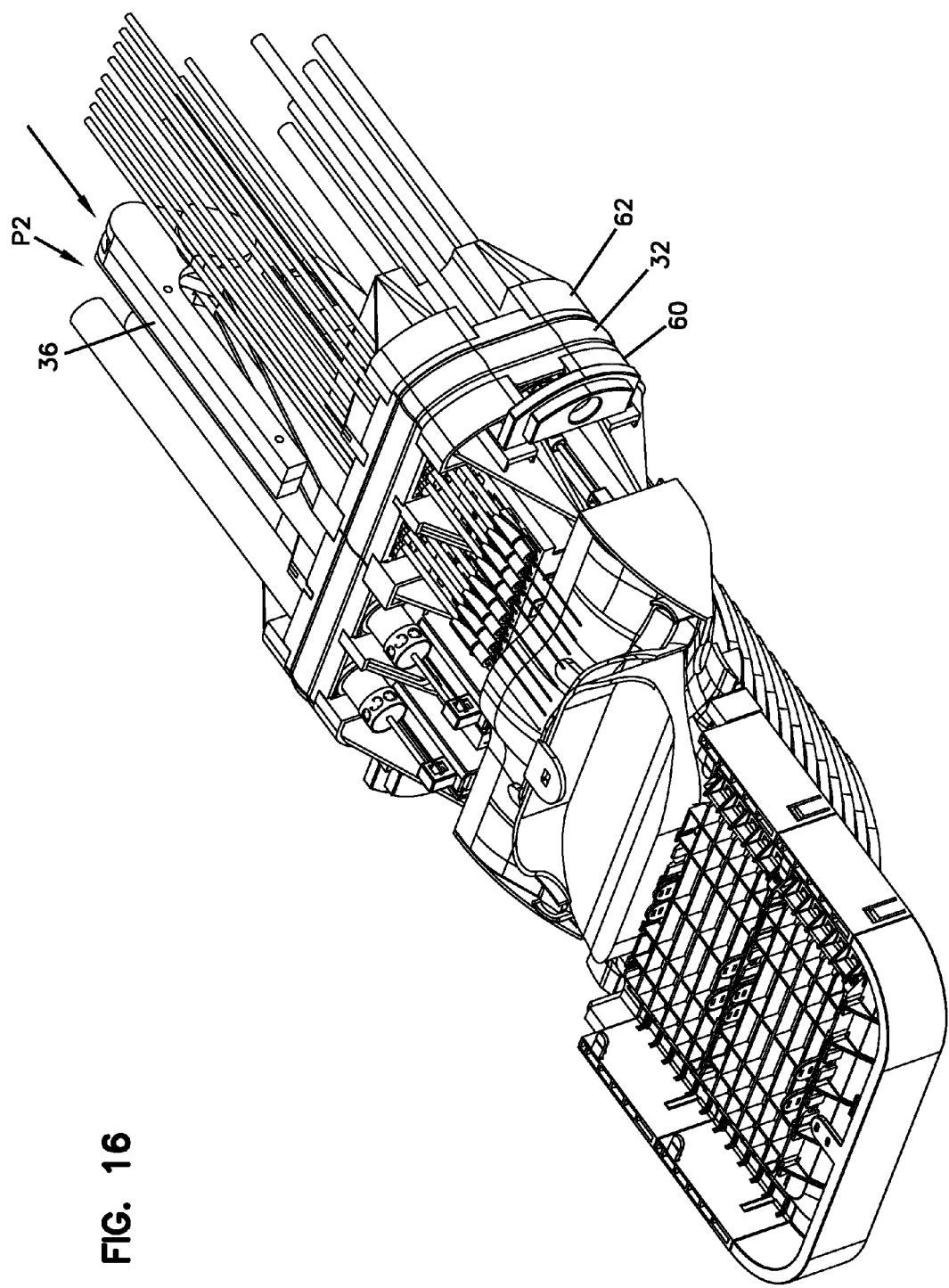
FIG. 16 shows the sealing unit of FIG. 3 in an actuated position.

FIGS. 1-3 show a telecommunications enclosure 20 in accordance with the principles of the present disclosure. The enclosure 20 includes a housing 22 having an end 24 defining a sealing unit opening 26. The sealing unit opening 26 is defined by a base 27 of the enclosure 20. The base 27 has a hollow sleeve-like configuration. A dome-style cover 29 is secured to the base 27 by a channel clamp 25. The enclosure 20 also includes a sealing unit 28 (see FIGS. 3 and 4) that fits within the sealing unit opening 26. The sealing unit 28 includes a sealant arrangement 32 (see FIG. 9) defining a plurality of cable ports 30. When pressurized, the sealant arrangement 32 is configured for providing seals about structures (e.g., cables, plugs, etc.) routed though the cable ports 30 and is also configured for providing a peripheral seal between the housing 22 and the sealing unit 28. The enclosure 20 further includes an actuation arrangement 31 (see FIGS. 5 and 9) for pressurizing the sealant arrangement 32 within the sealing unit opening 26. The actuation arrangement 31 is shown including an actuator 35 having a lever arm 36. The sealant arrangement 32 is pressurized as the actuator 35 is moved from a non-actuated position P1 (see FIG. 3) toward an actuated position P2 (see FIG. 16). In other embodiments, actuation arrangements having alternative types of actuators (e.g., threaded, screw type actuators) can be used.

Figure 4:
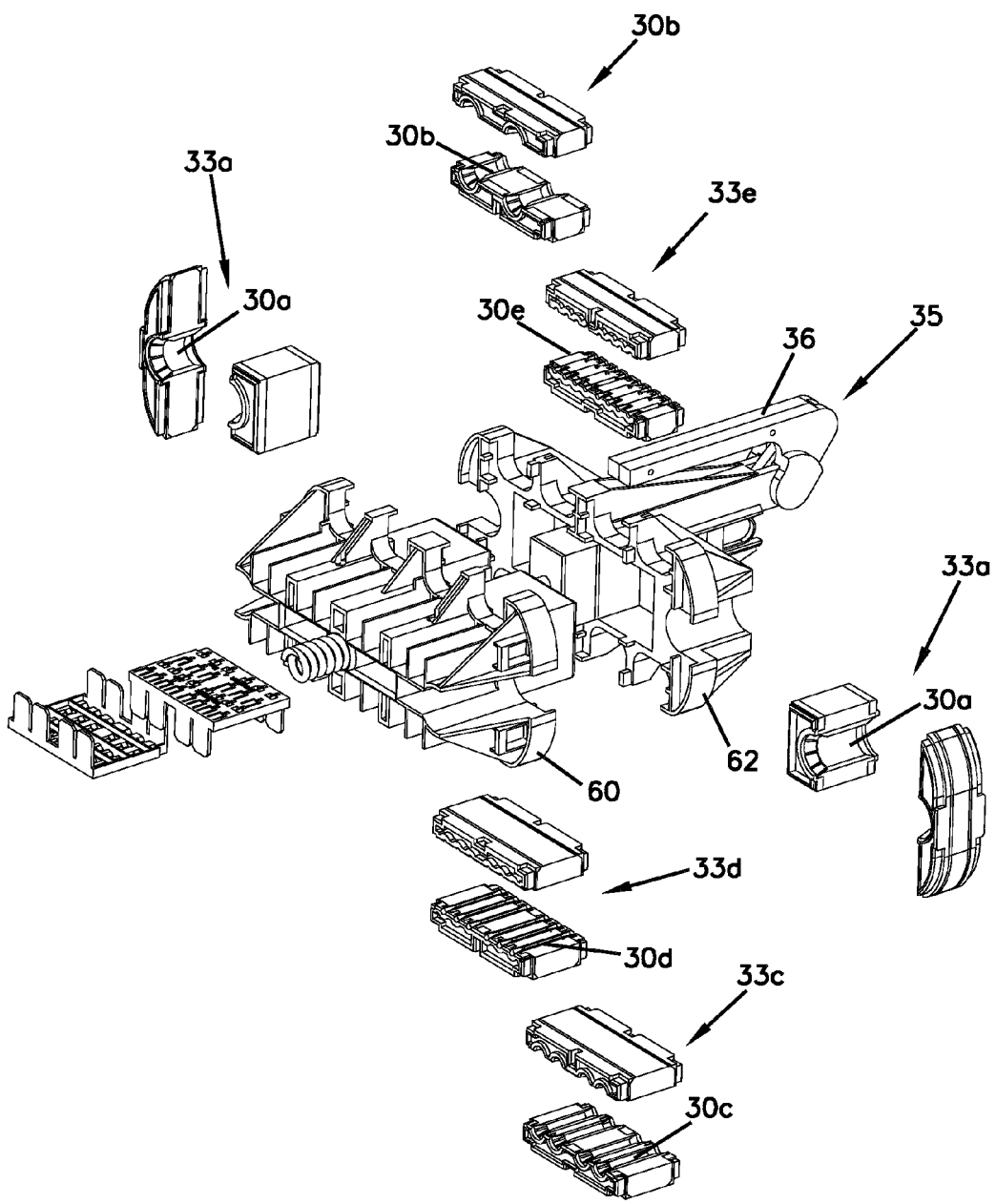
FIG. 4 is an exploded view of the sealing unit of FIG. 3 showing cable sealing modules of the sealing unit and also showing an actuation arrangement of the sealing unit.
Figure 5:
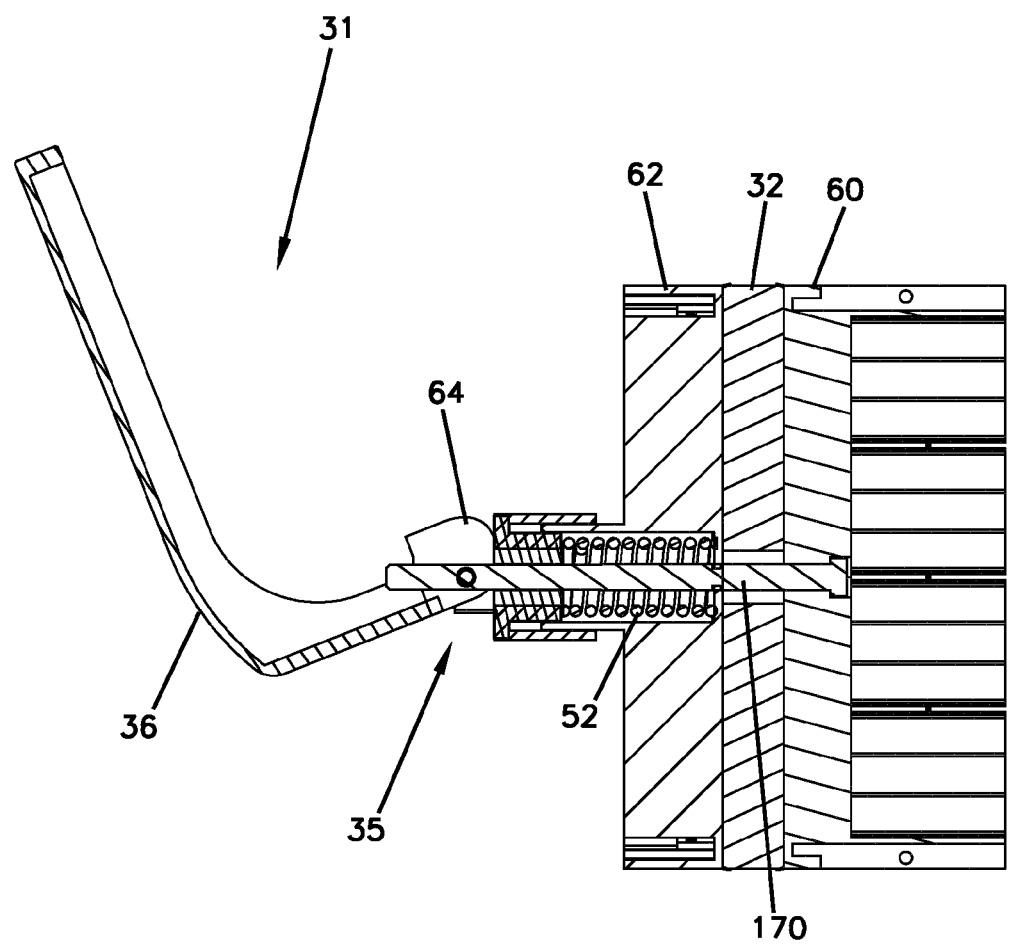
FIG. 5 is a cross-sectional view showing one example type of actuation arrangement that can be used to pressurize the sealing unit of FIG. 4.

Referring to FIG. 5, the actuation arrangement 31 includes inner and outer pressurization structures 60, 62 (e.g., plates, members, bodies, etc.). As shown at FIG. 3, a frame 190 supporting a plurality of optical components 192 (e.g., splice trays, optical splitter trays, splices, splitters, wavelength division multiplexers, slack storage devices, spools, etc.) is attached to the inner pressurization structure 60 and carried with the sealing unit 28. The sealant arrangement 32 is positioned between the inner and outer pressurization structures 60, 62. The actuator 35 includes a spring 52 for transferring a seal pressurization force from the lever arm 36 to the sealant arrangement 32. When the lever arm 36 is moved toward the actuated positions, the lever arm 36 generates a pressurization force that presses the sealant arrangement 32 between the first and second pressurization structures 60, 62. More specifically, a pressurization force from the lever arm 36 is transferred from lever cam surface 64 through the springs 52 and through shaft 170 to the inner and outer pressurization structures 60, 62. In this way, the first and second pressurization plates 60, 62 are spring biased toward one another such that spring pressure is applied to the sealant arrangement 32 for pressurizing the sealant arrangement 32 to maintain the seals over an extended period of time. In other embodiments, different actuation configurations can be used. For example, as shown at FIGS. 4 and 8, the cam surface of the lever arm can act against a sleeve coupled to the outer pressurization structure, and the spring can be captured between an inner end of the shaft and the inner pressurization structure.

Figure 8:
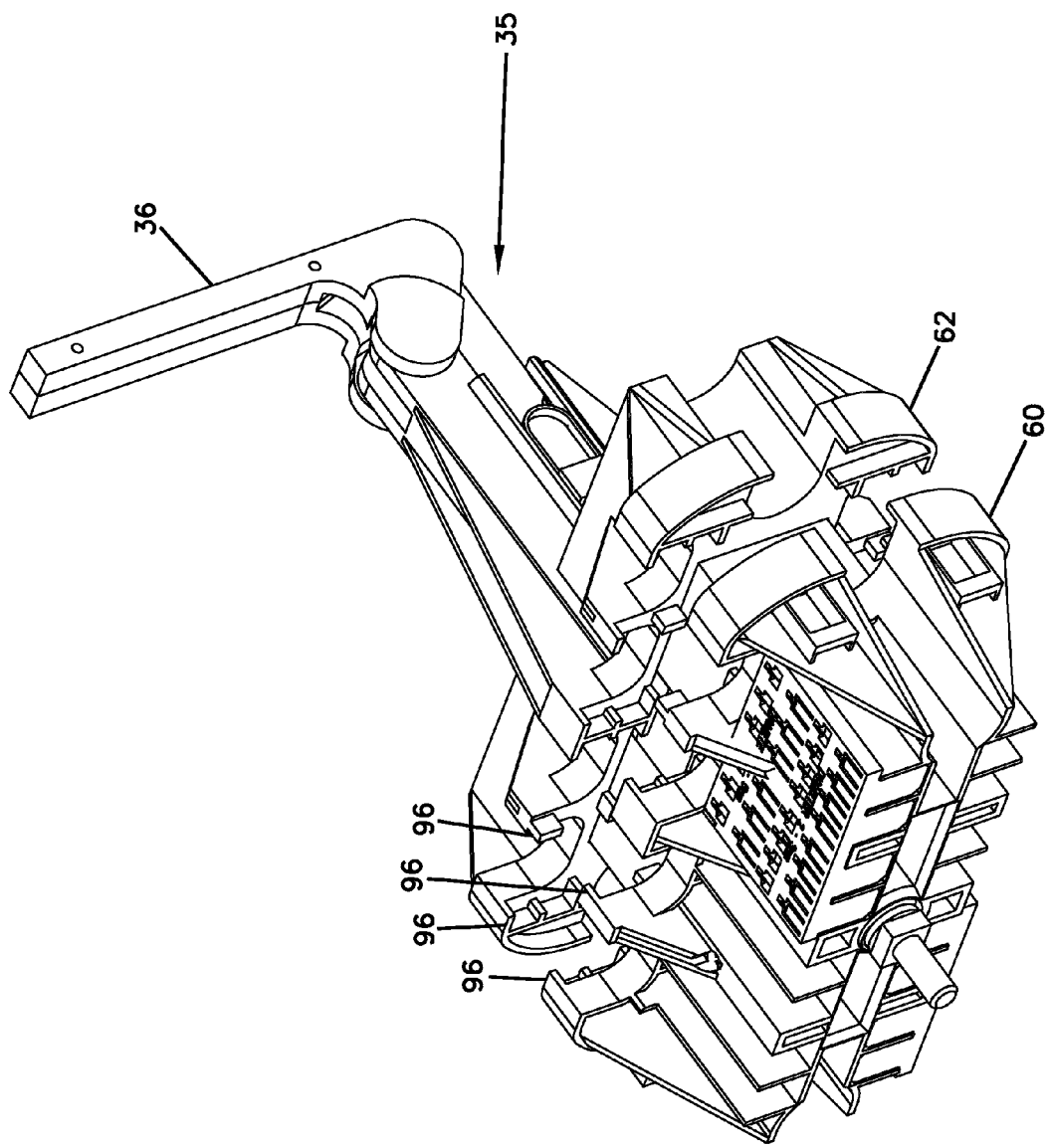
FIG. 8 shows the pressurization arrangement of the sealing unit of FIGS. 3 and 4 with the cable sealing modules removed.

Referring to FIG. 8, the sealant arrangement 32 includes multiple separately identifiable cable sealing modules 33 that are collectively pressurized by the actuation arrangement 31. When the actuation arrangement 31 is actuated, the cable sealing modules 33 are all axially pressurized between the inner and outer pressurization structures 60, 62. As the cable sealing modules 33 are pressurized, sealant portions of the cable sealing modules 33 flows/deforms to fill voids within the sealing unit opening 26 to form the peripheral seal with the housing 22, and to form seals around any cables or inserts positioned within cable ports 30.

Aspects of the present disclosure relate to techniques for allowing the sealing arrangement 32 to be readily reconfigured to accommodate cables of different sizes, cross-sectional shapes/profiles and numbers. In this regard, the enclosure 20 can be sold as a kit with multiple cable sealing modules having different port configurations. The cable sealing modules 33 can have different port counts, different port sizes and different port shapes. By selecting certain ones of the cable sealing modules 33, the cable sealing unit 28 can be customized to meet the needs of a given customer or a given application. In the case of a kit, an installer can select and install desired cable sealing modules 33 in the field to customize the enclosure 20 for a particular use, and can save unused cable sealing modules 33 for later use to re-configure the enclosure 20 as needed. The enclosure 20 can also be assembled in the factory. When factory assembled, the ability to select cable sealing modules 33 having different configurations allows one style of actuation arrangement 31 to be used to provide many different port configurations. This assists in manufacturing efficiency because many different port configurations can be provided without requiring different models of actuation arrangements 31 to be designed or stocked.

Figure 9:
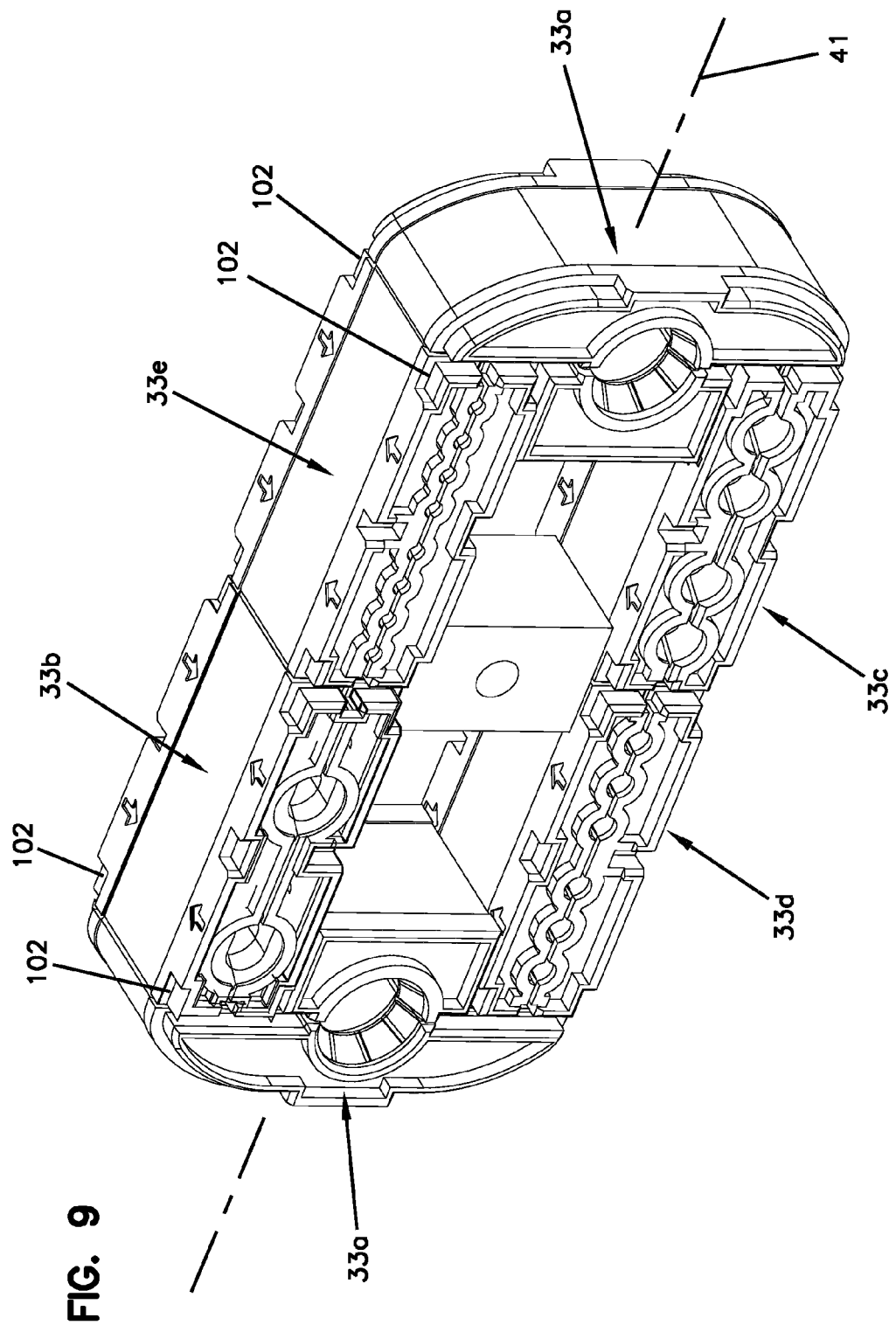
FIG. 9 shows the sealing modules of the sealing unit of FIGS. 3 and 4 in an assembled configuration with the actuation arrangement removed.

Referring to FIG. 9, the cable sealant arrangement 32 is shown including cable sealing modules 33a, 33b, 33c, 33d and 33e. The cable sealing modules 33a each define one relatively large cable port 30a adapted for receiving a main trunk cable or main distribution cable. The main distribution cable may loop or pass through the enclosure 20 so that one portion of the cable enters the enclosure 20 through one of the cable ports 30a and another portion of the cable exits the enclosure 20 through the other cable port 30a. Within the enclosure 20, optical fibers of the distribution cable can be accessed for splicing to drop cables or for connecting to an optical splitter. The cable sealing module 33b (see FIGS. 9 and 10) defines two cable ports 30b. The cable sealing module 33c (see FIGS. 9 and 11) defines four cable ports 30c. The cable sealing module 33d (see FIGS. 9 and 12) defines six cable ports 30d. The cable sealing module 33e (see FIGS. 9 and 13) defines eight cable ports 30e. In other embodiments, a cable sealing module 33f (see FIG. 14) including ports 30f adapted for receiving flat drop cables can also be used. In addition to the inserts specifically depicted, it will be appreciated that inserts having different numbers of cable openings, different shapes of cable openings, and different sizes of cable openings can also be used to accommodate different cable types.

As shown at FIG. 9, the sealant arrangement 32 is elongated along a major axis 41. It will be appreciated that the major axis 41 corresponds to a major axis of the sealing unit opening 26. The cable sealing modules 33a are spaced-apart from one another along the major axis 41 and are positioned at opposite lateral ends of the sealant arrangement 32. The cable sealing modules 33b-33e are mounted along the major axis 41 between the cable sealing modules 33a. The cable sealing modules 33b, 33e form a first row of cable ports positioned on one side of the major axis 41 (e.g., above the major axis) and the cable sealing modules 33c, 33d form a second row of cable ports positioned on an opposite side of the major axis 41 (e.g., below the major axis 41). The rows are parallel to the major axis 41 and extend between the cable sealing modules 33a.

Figure 15:
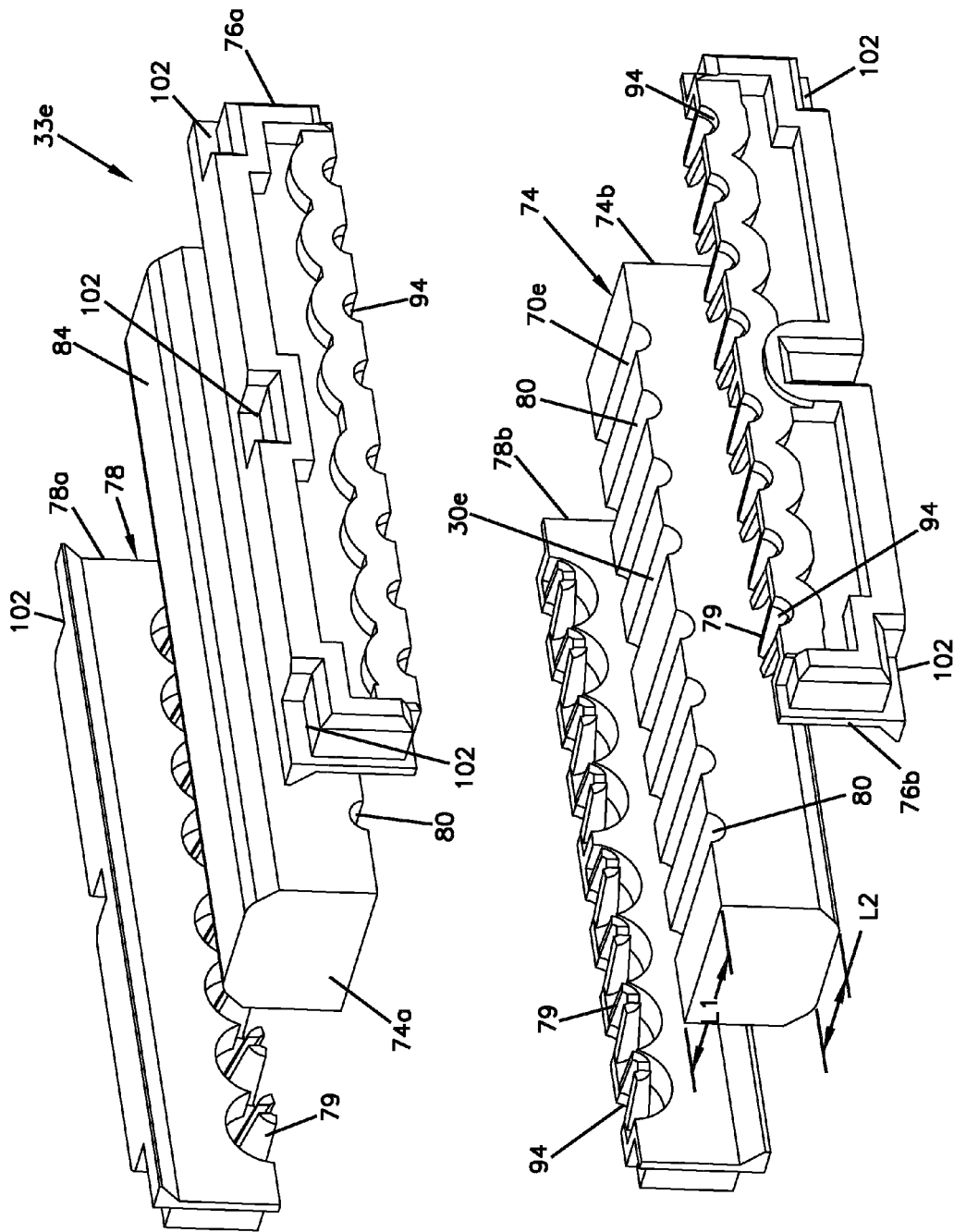
FIG. 15 is an exploded view of the cable sealing module of FIG. 13.

Referring to FIGS. 13 and 15, the cable sealing module 33e is depicted. It will be appreciated that other than the size, shape and number of ports provided, the cable sealing modules 33b-33d and 33f can have similar constructions. Thus, the description pertaining to the cable sealing module 33e is applicable to the other cable sealing modules 33b, 33c, 33d and 33f as well.

Referring to FIGS. 13 and 15, the cable sealing module 33e includes a body 90 having a total axial length L that extends between first and second axial ends 70, 72 of the body 90 along a central axis 91. The body 90 can have a composite construction including a volume of sealant 74 at least partially contained axially between first and second axial containment structures 76, 78. The first and second axial containment structures 76, 78 are respectively positioned adjacent the first and second ends 70, 72 of the body 90 and form axial end caps of the body 90. The first and second axial containment structures 76, 78 can be attached (e.g., bonded) to ends of the volume of sealant 74. In other embodiments, the containment structures 76, 78 may not be attached to the volume of sealant 74, but when assembled within the actuation arrangement 31 can be held in position relative to the volume of sealant 74.

The first and second axial containment structures 76, 78 are preferably constructed of a material that has a higher hardness and is less flowable than the sealant material constituting the volume of sealant 74. Thus, when the volume of sealant 74 is pressurized to provide cable sealing, the first and second axial containment structures 76, 78 assist in containing the volume of sealant 74 between the axial ends 70, 72 to limit the amount of volume of sealant 74 that is forced out of the sealing unit 28.

Figure 7:
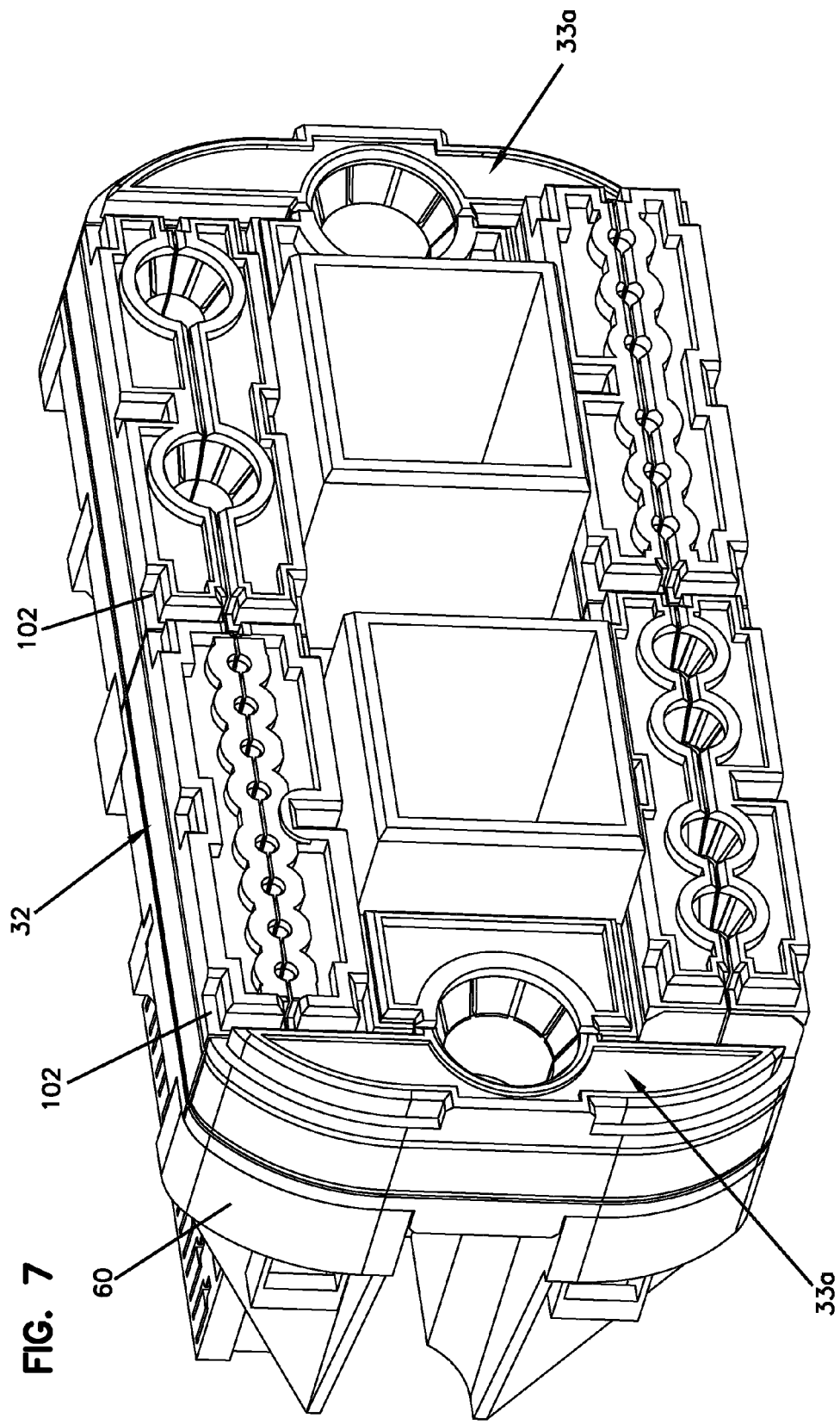
FIG. 7 shows the sealing unit of FIGS. 3 and 4 with and outer pressurization structure removed to better show sealing modules of the sealing unit.

As shown at FIGS. 7 and 9, the volumes of sealant 74 of the various cable sealing modules 33a-33e are in fluid communication with one another when assembled together to form the sealant arrangement 32 and are pressurized between the first and second pressurization structures 60, 62 when the actuation arrangement 31 is actuated. Outer portions of the volumes of sealant 74 of the modules 33a-33e are adapted to contact the interior of the base 27 to form the peripheral seal with the base 27 when the actuation arrangement 31 is actuated.

The harder material of the containment structures 76, 78 does not extend the total axial length L of the body 90. Instead, only the volume of sealant 74 of the body 90 is located between the containment structures 76, 78. Thus, the containment structures 76, 78 can move axially relative to one another as the volume of sealant 74 is axially compressed. For example, the containment structures 76, 78 can be moved axially with the first and second pressurization structures 60, 62 to assist in providing axial pressurization of the volumes of sealant 74 when the actuation arrangement 31 is actuated. In certain embodiments, the body 90 does not have any axial reinforcing structure that extends across the volume of sealant 74 and that interconnects containment structures 76, 78 Instead, the containment structures 76, 78 are connected together only by the volume of sealant 74. As shown at FIG. 15, the containment structures 76, 78 can include truncated, conical parts 79 that project into the volume of sealant 74 in alignment with cable ports 30e that extend axially through the volume of sealant 74.

The body 90 defines the plurality of reduced sized cable ports 30e that extend axially through the volume of sealant 74. The volume of sealant 74 includes cable sealing surfaces 80 that define the reduced sized cable ports 30e. Cable sealing surfaces 80 each have a first axial length L1 (see FIGS. 15 and 22) that extends axially between the first and second axial containment structures 76, 78. The volume of sealant 74 also includes an exposed outer sealing surface 84 that surrounds a periphery of the body 90 and that extends around the central axis 91. The outer sealing surface 84 has a second axial length L2 (see FIGS. 15 and 22) that extends axially between the first and second containment structures 76, 78. The first axial length L1 is longer than the second axial length L2 to provide effective sealing about cables routed through the cable ports 30e. The first and second containment structures 76, 78 define openings 94 that align with the cable ports 30e.

In certain embodiments, the first and second containment structures 76, 78 of the cable sealing module 33e interface with the pressurization structures 60, 62 such that the pressurization structures 60, 62 apply pressure axially through the first and second axial containment structures 76, 78 to the volume of sealant 74 when the actuation arrangement 31 is actuated. In certain embodiments, engagement portions 96 (e.g., tabs, lips, flanges, etc.) of the pressurization structures 60, 62 overlap the first and second containment structures 76, 78 such that the body 90 is captured axially between the pressurization structures 60, 62. In certain embodiments, the pressurization structures 60, 62 mate, interlock or otherwise connect with the containment structures 76, 78. For example, engagement portions 96 (e.g., projections) of the pressurization structures 60, 62 can fit within receptacles 102 defined by the containment structures 76, 78 (see FIG. 6).

Figure 6:
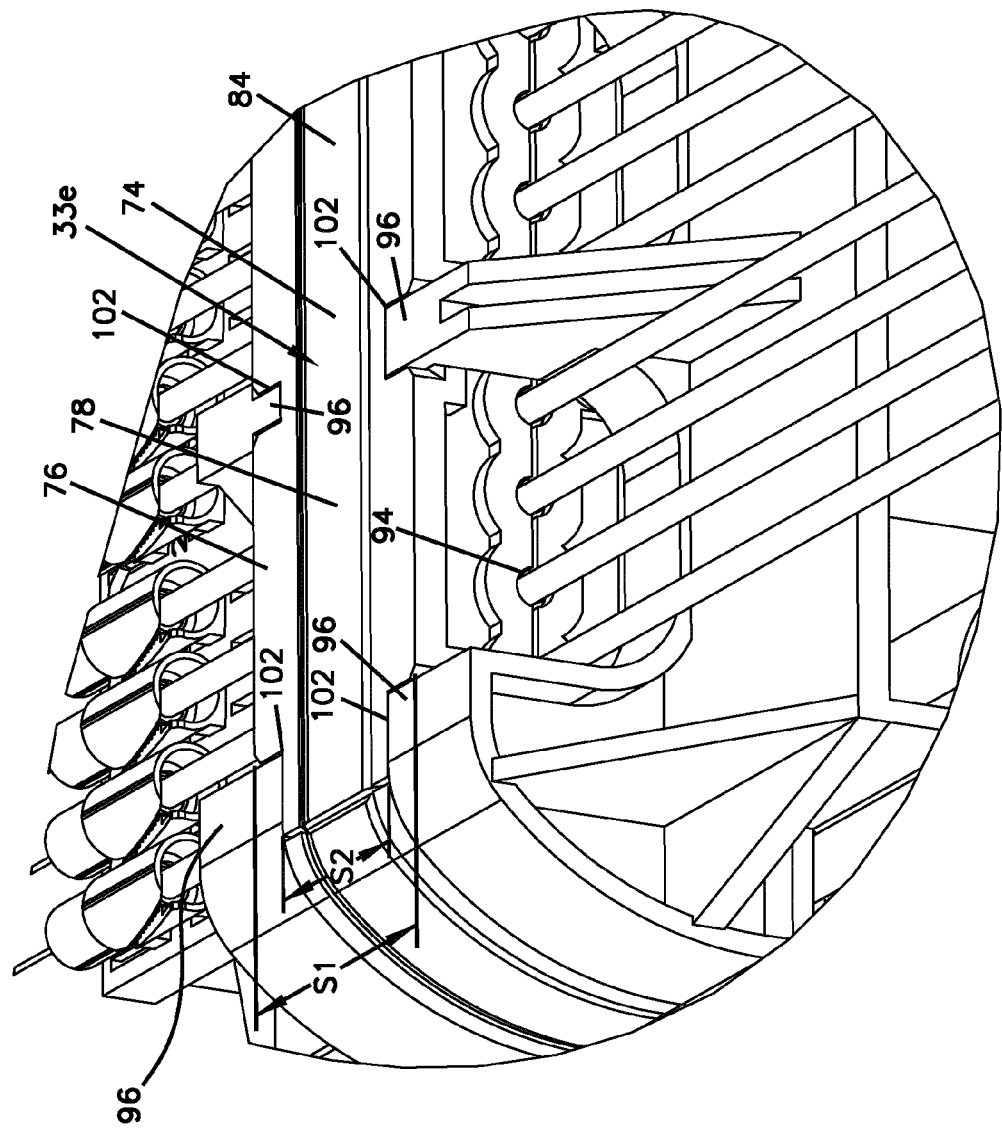
FIG. 6 is an enlarged view of a portion of the sealing unit of FIGS. 3 and 4.

To load the cable sealing modules 33 between the pressurization structures 60, 62, the cable sealing modules 33 are manually compressed in an axial direction (i.e., the first and second containment structures 76, 78 are manually compressed together) to provide clearance for allowing the cable sealing modules 33 to fit between the pressurization structures 60, 62. Referring to FIG. 6, when the cable sealing modules 33 are not axially compressed, the receptacles 102 define an axial spacing S1. The engagement portions 96 of the pressurization structures 60, 62 define an axial spacing S2. In one example, the actuation arrangement 31 is configured such that the axial spacing S2 is always smaller than the axial spacing S1 defined by the cable sealing modules 33 when the cable sealing modules 33 are not axially compressed, even when the actuation arrangement 31 is in a fully expanded position. In this way, the cable sealing modules 33 are positively retained between the pressurization structures 60, 62 by an interference fit such that the cable sealing modules 33 will not unintentionally fall out from between the pressurization structures 60, 62 when the actuation arrangement 31 is fully de-actuated. To remove one of the cable sealing modules 33 between the pressurization structures 60, 62, the cable sealing module 33 is manually compressed in an axial direction until the axial spacing S1 is less than the spacing S2 and then the cable sealing module 33 can be manually pulled from between the pressurization structures 60, 62. Similarly, to insert one of the cable sealing modules 33 between the pressurization structures 60, 62, the cable sealing module 33 is manually compressed in an axial direction until the axial spacing S1 is less than the spacing S2 and then the cable sealing module 33 can be manually inserted between the pressurization structures 60, 62 and then allowed to expand to lock the module between the pressurization structures 60, 62.

Referring back to FIGS. 13 and 15, the body 90 is depicted as rectangular the outer sealing surface 84 forms an outer sealing band between the first and second containment structures 76, 78. In certain embodiments, the body 90 has a wrap-around configuration for allowing cables to be laterally inserted in the cable port 30e. As shown at FIG. 15, the wrap-around configuration is provided by manufacturing the volume of sealant 74 in two parts 74a, 74b which allows the body 90 to be moved between a closed configuration and an open configuration. The parts 74a, 74b each define portions (e.g., half-portions) of each of the cable ports 30e. Similarly, the first and second containment structures 76, 78 each include two parts 76a, 76b; 78a, 78b which respectively correspond to the parts 74a, 74b and which define portions (e.g., half-portions) of the openings 94.

To route a cable through the sealing unit 28, the sealing unit 28 is first de-actuated and removed from then housing 22. The parts 74a, 76a, 78a are then removed from the actuation arrangement 31 to expose the cable ports 30e. Fiber optic cables 106 are then loaded into the ports 30e. The parts 74a, 76a, 78a are then re-installed in the actuation arrangement 31 and the sealing unit 28 is re-inserted into the housing 22 and the actuation arrangement 31 is actuated to compress the sealant arrangement 32 to provide seals about fiber optic cables 106 routed through the sealing unit 28 and to provide the peripheral seal with the base 27 of the housing 22.

Figure 17:
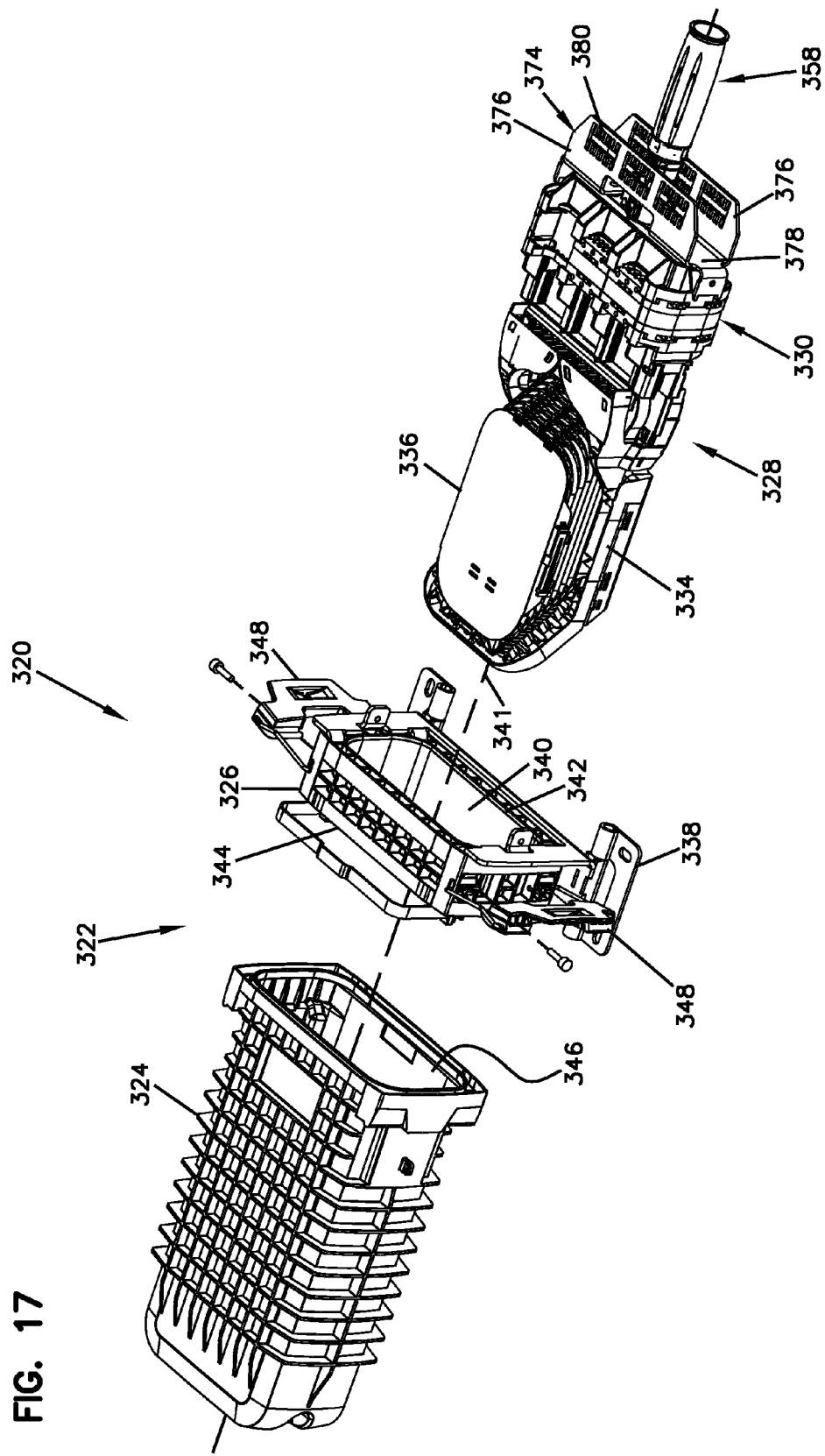
FIG. 17 is an exploded view of another telecommunications enclosure in accordance with the principles of the present disclosure.

FIG. 17 illustrates another telecommunications enclosure 320 in accordance with the principles of the present disclosure. The telecommunications enclosure 320 includes a housing 322 having a dome 324 that connects to a base 326. The telecommunications enclosure 320 also includes an insert assembly 328 that fits within the housing 322. The insert assembly 328 includes a sealing unit 330 that fits within the base 326 and that defines a plurality of cable ports 332 (see FIG. 18). The insert assembly 328 also includes a frame 334 attached to the sealing unit 330 and one or more telecommunications components 336 (e.g., optical splicing trays, optical splices, optical power splitters, optical power splitting trays, wavelength division multiplexers, fiber managers, slack fiber storage devices and/or other structures) mounted on the frame 334. The frame 334 is housed within the dome 324 when the sealing unit 330 is fitted within the base 326. The telecommunications enclosure 320 further includes a mounting bracket 338 for mounting the housing 322 at a desired mounting location (e.g., on a wall, on a pole, on a handle, or at any other location) via fasteners.

The base 326 of the housing 322 has a hollow, sleeve-like configuration and defines a main opening 340 that extends through the base 326 from an outer end 342 of the base 326 to an inner end 344 of the base 326. The inner end 344 of the base 326 connects with an open end 346 of the dome 324 at sealed interface. Latches 348 are used to latch the dome 324 to the base 326. The main opening 340 defines an opening central axis 341 that extends through the main opening 340. The insert assembly 328 is inserted into and through the base 326 along the central axis 341. In other examples, the base 326 can be eliminated and the sealing unit 330 can mount directly in the open end 346 of the dome 324 or in any other type of cable access opening defined by a housing.

Figure 18:
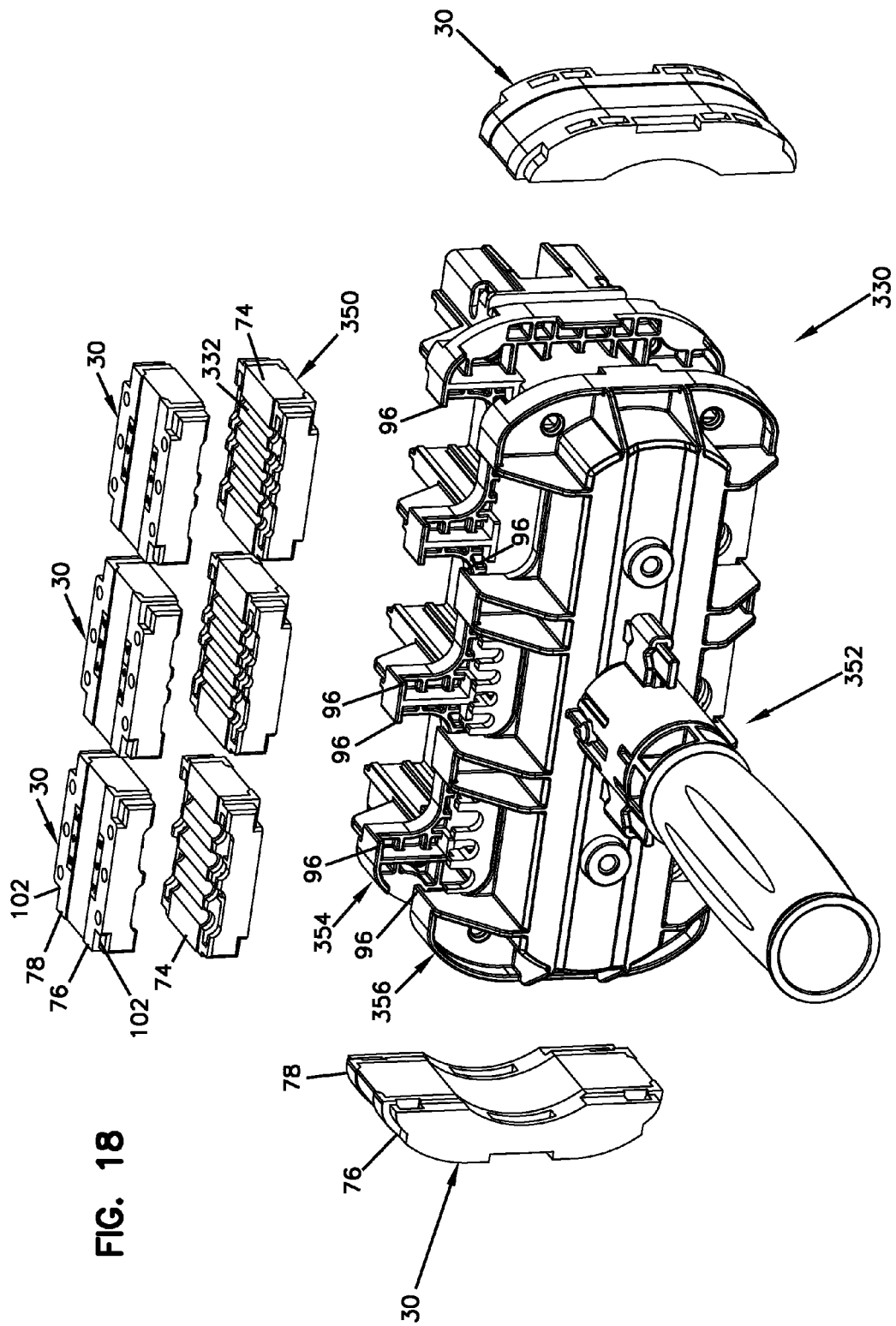
FIG. 18 is an exploded view of a sealing unit of the telecommunications enclosure of FIG. 17.
Figure 19:
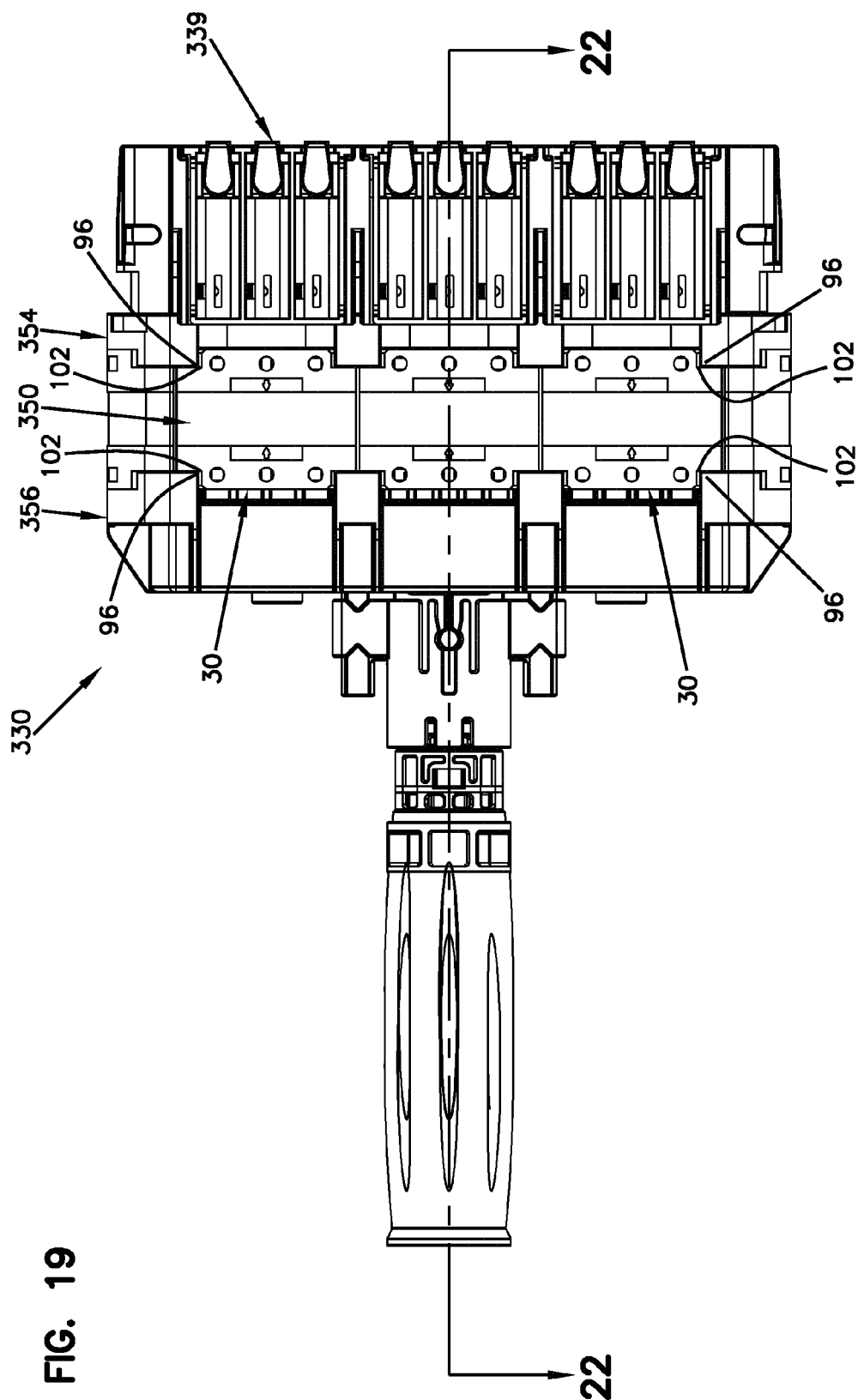
FIG. 19 is a top view of the sealing unit of FIG. 18.

Referring to FIGS. 18 and 19, the sealing unit 330 of the telecommunications enclosure 320 includes a sealant ring 350 (e.g., gel, rubber, silicone rubber, or like materials) that defines the cable ports 332. The sealant ring 350 is formed by a plurality of cable sealing modules 33 of the type previously described. The cable sealant modules 33 are positioned within the sealing unit 330 such that the volumes of sealant 74 of adjacent cable sealing modules 33 contact each other. In this way, the volumes of sealant 74 cooperate to define the continuous sealant ring 350. The sealing unit 330 also includes an actuation arrangement 352 for pressurizing the sealant ring 350 thereby causing the sealant ring 350 to form seals around cables routed through the cable ports 332.

The actuation arrangement 352 includes inner and outer axial pressurization structures 354, 356 between which the sealant ring 350 is positioned. The axial containment structures 76, 78 of the cable sealing modules 33 interlock with or otherwise engage the inner and outer axial pressurization structures 354, 356 such that inner and outer axial pressurization structures 354, 356 and the axial containment structures 76, 78 work together to pressurize the volumes of sealant 74 forming the sealant ring 350. Specifically, the cable sealing modules 33 are captured axially between portions of the inner and outer axial pressurization structures 354, 356 with the first axial containment structures 76 engaging the outer axial pressurization structure 356 and the second axial containment structures 78 engaging the inner axial pressurization structures 354. Engagement portions 96 of the outer axial pressurization structure 356 fit within receptacles 102 of the first axial containment structures 76 and engagement portions 96 of the inner axial pressurization structure 354 fit within receptacles 102 of the second containment structures 78. Sealant pressurization force is transferred axially from the inner and outer axial pressurization structures 354, 356 through the axial containment structures 76, 78 to the volumes of sealant 74 forming the sealant ring 350. The first axial containment structures 76 correspond to the outer axial pressurization structure 356 and can be referred to as outer axial containment structures. The second axial containment structures 78 correspond to the inner axial pressurization structure 354 and can be referred to as inner axial containment structures.

The actuation arrangement 352 also includes an actuator 358 for forcing the inner and outer axial pressurization structures 354, 356 together to pressurize the sealant ring 350. When the sealing unit 330 is fitted within the base 326, an axial inner side 360 (see FIGS. 22 and 23) of the sealant ring 350 faces toward the dome 324 and an axial outer side 362 of the sealant ring 350 faces away from the dome 324. The second axial containment structures 78 oppose the axial inner side 360 of the sealant ring 350 and the first axial containment structures 76 oppose the axial outer side 362 of the sealant ring 350. The inner pressurization structure 354 restrains inward axial movement of the second axial containment structures 78 and the outer pressurization structure 356 retrains outward axial movement of the first axial containment structures 76. The cable ports 332 extend axially through the sealant ring 350 along the central axis 341 of the main opening 340 such that cables can be directed through the base 326 and into the dome 324 by routing the cables through the cable ports 332. When the sealant ring 350 is pressurized by the actuation arrangement 352, an outer radial surface 349 of the sealant ring 350 forms an outer radial seal 351 with the interior of the base 326 and an inner radial surface 347 of the sealant ring 350 forms an inner radial seal 353 with an outer surface of a centrally located outer axial extension 355 (see FIGS. 22 and 23) of the inner pressurization structure 354. The inner and outer radial seals 351, 353 both extend continuously around the central axis 341. In the depicted embodiment, the outer axial extension 355 is hollow so as to define an open chamber 357 around which the sealant ring 350 extends. By providing a sealant free region that extends through the sealant ring 350 and that is defined by the inner axial pressurization structure 354, the total volume of sealant 74 used by the sealing unit 330 can be reduced.

Figure 22:
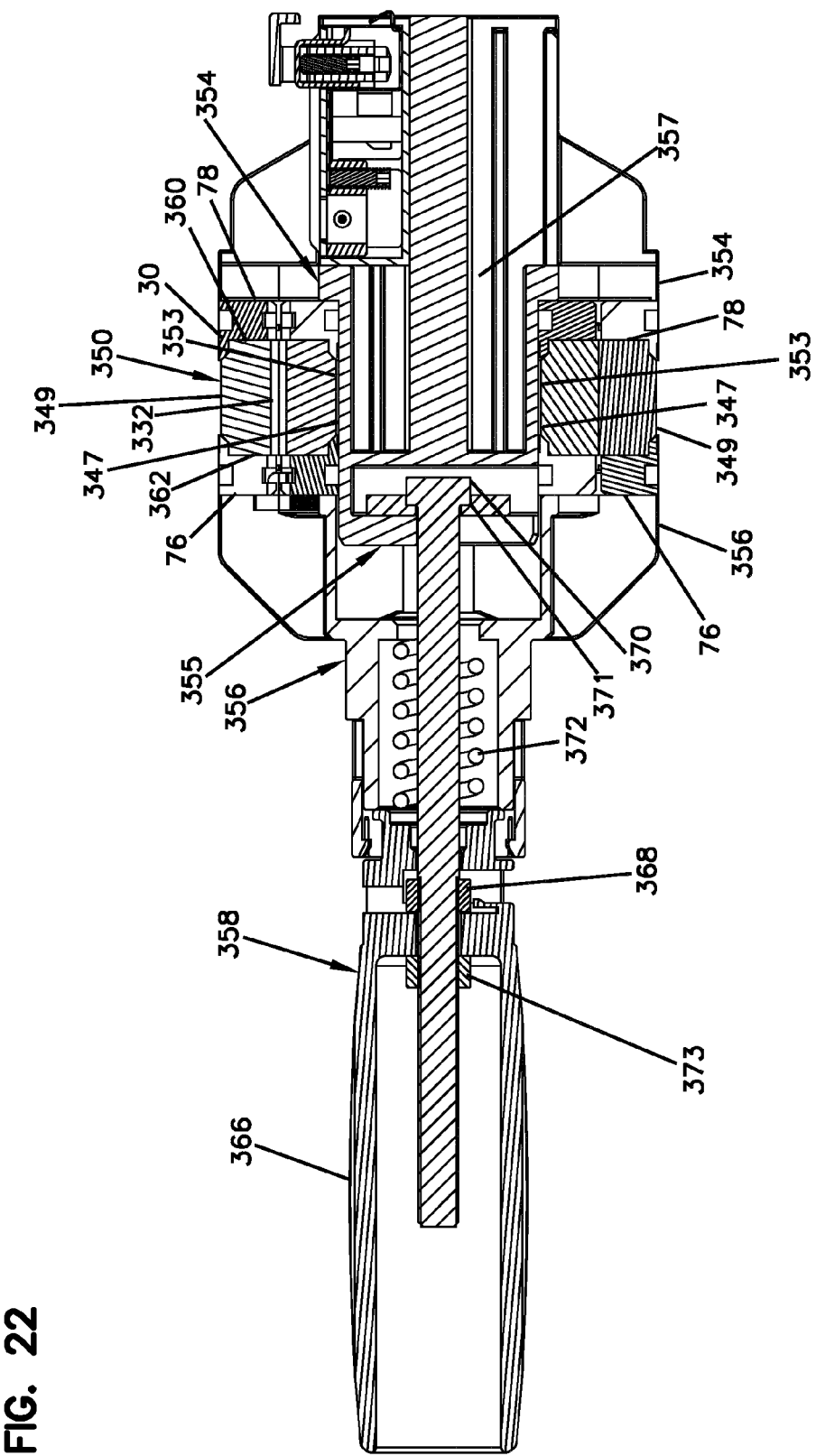
FIG. 22 is a cross-sectional view taken along section line 22-22 of FIG. 19.
Figure 23:
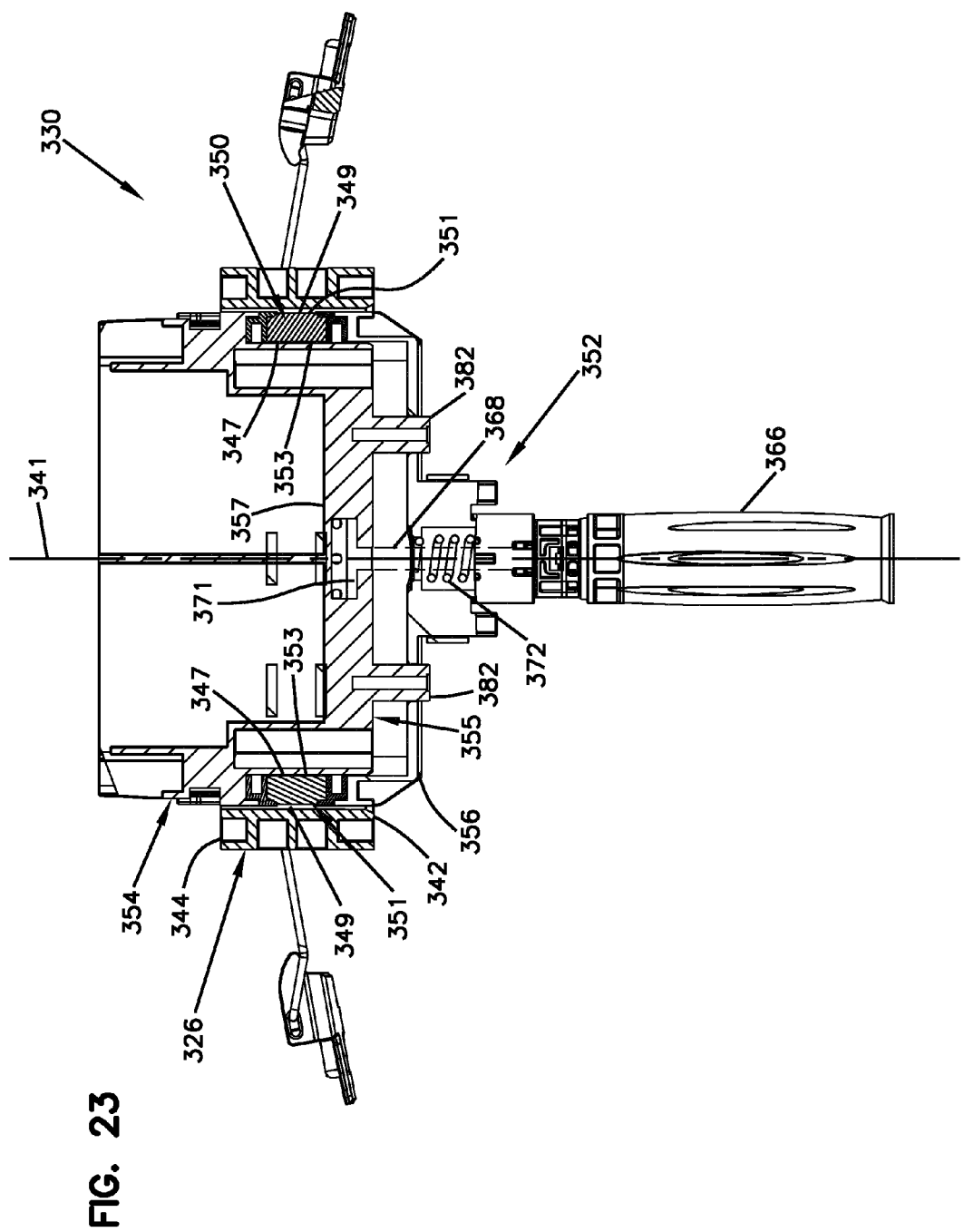
FIG. 23 is a partial cross-sectional view of the sealing unit of FIG. 18 taken along a generally horizontal cross-sectional plane.

Referring to FIGS. 22 and 23, the actuator 358 includes a handle 366 that is threaded on a threaded actuator shaft 368. An inner end 370 of the threaded actuator shaft 368 is secured to the outer axial extension 355 of the inner pressurization structure 354 at an anchoring location 371. The anchoring location 371 is positioned axially outward from the inner and outer radial seals 351, 353 and the overall configuration is arranged so that a seal is not required about the threaded actuator shaft 368. The threaded actuator shaft 368 is mounted so as to not rotate relative to the inner pressurization structure 354. The actuator 358 further includes a spring 372 positioned axially between the handle 366 and the outer pressurization structure 356. The spring 372 is positioned around the threaded actuator shaft 368. By threading the handle 366 in a first direction about the threaded actuator shaft 368, the handle 366 compresses the spring 372 axially against the axial outer side 362 of the outer pressurization structure 356 thereby causing the inner and outer pressurization structures 354, 356 to be forced together such that the sealant ring 350 between the inner and outer pressurization structures 354, 356 is pressurized. By threading the handle 366 in a second direction about the threaded actuator shaft 368, the spring 372 is decompressed thereby depressurizing the sealant ring 350. While the actuator 358 is depicted including a handle 366 on a threaded actuator shaft 368, it will be appreciated that other actuation configurations such as cam lever actuation devices having non-threaded actuator shafts or other structures can be used.

Referring to FIG. 22, the actuator 358 also includes a locking structure such as a fixed nut 373 anchored at a fixed axial location on the threaded actuator shaft 368. The fixed nut 373 limits the distance the handle 366 can be axially retracted on the threaded actuator shaft 368 when the handle 366 is turned in the second direction about the threaded actuator shaft 368. The position of the fixed nut 373 is selected such that the axial spacing S2 never exceeds the axial spacing S1.

Figure 24:
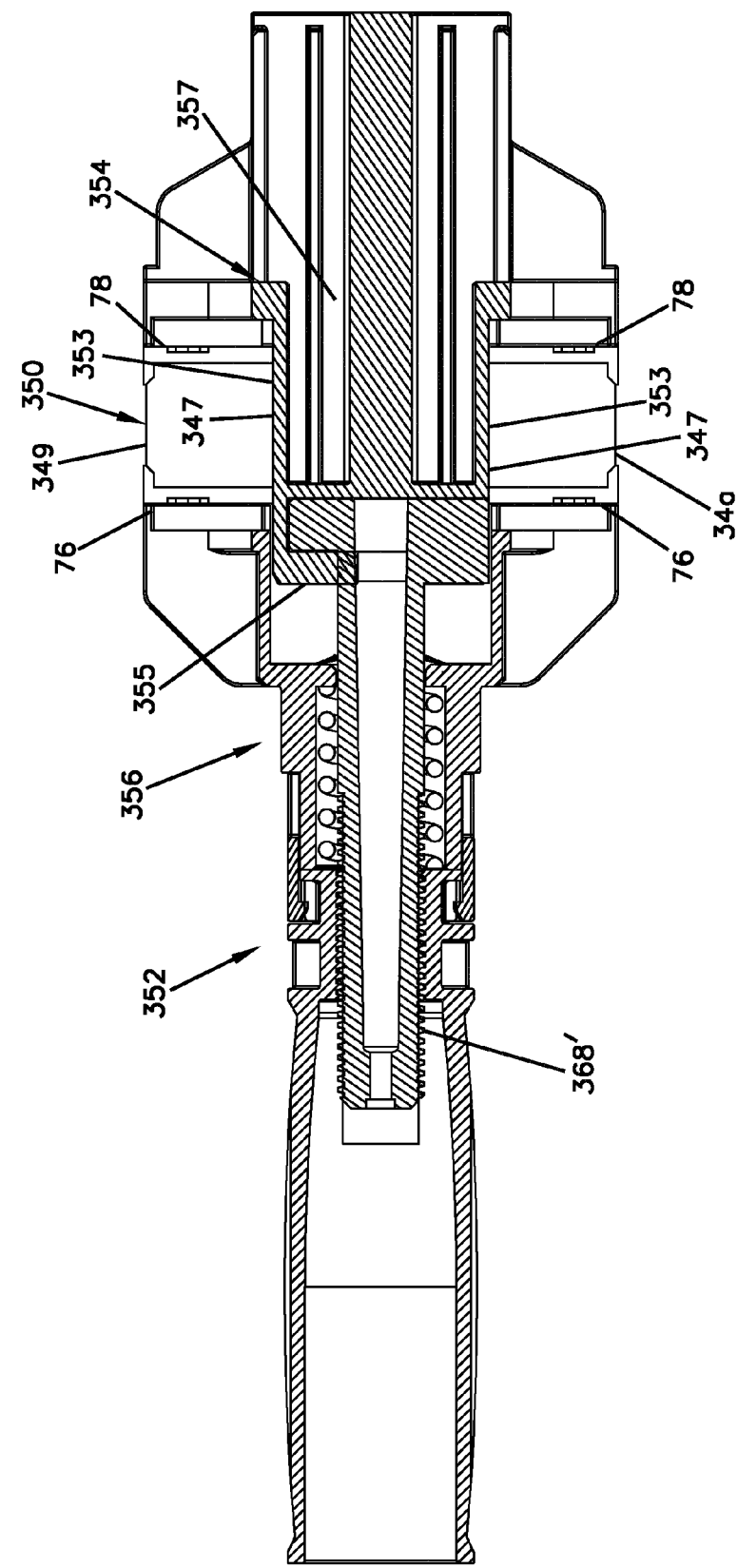
FIG. 24 is a cross-sectional view of another sealing unit in accordance with the principles of the present disclosure, the sealing threaded shaft made of a polymeric material.

The anchoring location 371 can include a slot defined by the inner pressurization structure 354 that receives the inner end 370 of the threaded actuator shaft 368. The threaded actuator shaft 368 can include an anti-rotation element that fits in the slot and includes one or more flats that oppose corresponding flats of the slot so that the threaded actuator shaft 368 is prevented from rotating relative to the inner pressurization structure 354. In the example of FIGS. 22 and 23, the threaded actuator shaft 368 can be metal and the inner pressurization structure 354 can be plastic. FIG. 24 shows an example having a plastic threaded actuator shaft 368' that engages the inner axial pressurization structure 354.

The insert assembly 328 further includes an exterior cable anchoring structure 374. The exterior cable anchoring structure 374 is configured for allowing cables to be anchored to the insert assembly 328 at a position outside of the housing 322. In the depicted embodiment, the exterior cable anchoring structure 374 includes two parallel cable anchoring plates 376 interconnected by a bridge plate 378. The threaded actuator shaft 368 and the handle 366 extend between the cable anchoring plates 376. The cable anchoring plates 376 include a plurality of cable tie-down locations 380 including openings for routing cable ties used to fasten the jackets of the cables routed into the housing 322 to the exterior cable anchoring structure 374. The exterior cable anchoring structure 374 is positioned outwardly from the outer pressurization structure 356 and is fixed relative to the inner pressurization structure 354. For example, the bridge plate 378 can be attached to exterior fastening sections 382 that are part of the outer axial extension 355 of the inner axial pressurization structure 354 and that extend axially through the outer pressurization structure 356. The exterior fastening sections 382 are fastened to the bridge plate 378 of the exterior cable anchoring structure 374 to fix the exterior cable anchoring structure 374 relative to the inner pressurization structure 354.

The insert assembly 328 can also include an interior cable anchoring structure 339 positioned on or near the frame 334.

The interior cable anchoring structure 339 can include fasteners, clamps, posts or other structures for securing the strength members (e.g., Kevlar members, fiber reinforced polymeric rods, or other structures) of the cables routed through the cable ports 332 to the frame 334. The frame 334 is preferably connected to the inner pressurization structure 354 so that movement is not permitted between the frame 334 and the inner pressurization structure 354. In this way, cables can be fixed relative to the inner pressurization structure 354 at locations both inside and outside the housing 322 of the telecommunications enclosure 320.

Figure 20:
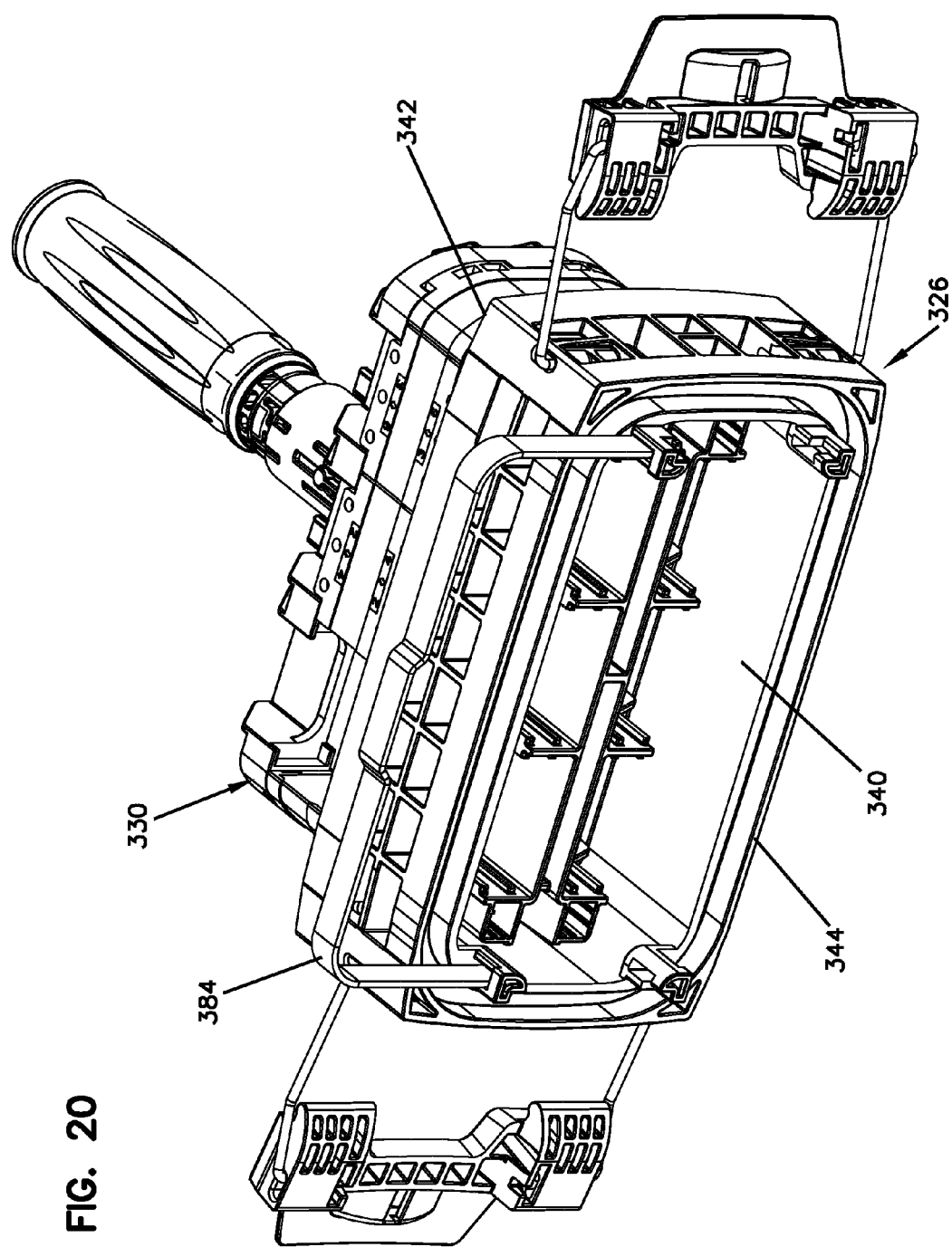
FIG. 20 is an axially inner perspective view of a base of the telecommunications enclosure of FIG. 17 with the sealing unit of FIG. 18 partially inserted within the base and with a sealing unit retainer in a non-retaining position.
Figure 21:
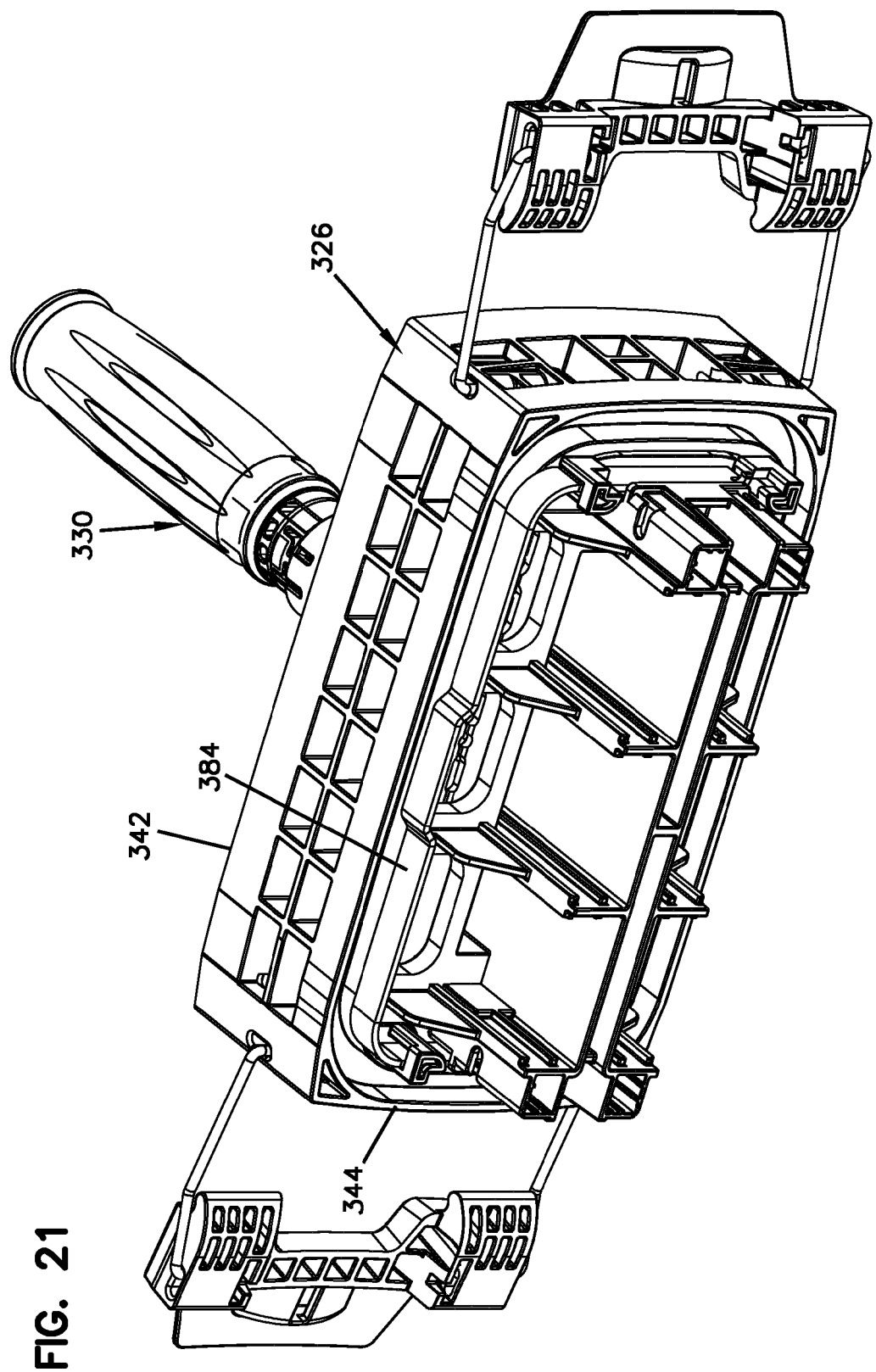
FIG. 21 shows the base and sealing unit of FIG. 20 with the sealing unit fully inserted within the base and with the sealing unit retainer in a retaining position.

The insert assembly 328 is configured to be inserted into the housing 322 through the outer end 352 of the base 326. For example, the insert assembly 328 is inserted through the base 326 along the central axis 341 that extends through the main opening 340 of the base 326. The insert assembly 328 is inserted through the base 326 until the sealing unit 330 is fully housed within the base 326. Once the sealing unit 330 is fully housed within the base 326, the inner pressurization structure 354 is anchored (e.g., fixed) relative to the base 326. For example, a retainer 384 (see FIGS. 20 and 21) can be used to fix the inner pressurization structure 354 relative to the base 326. The retainer 384 can be a U-shaped retainer that is slideably mounted to the base 326. In one example, the retainer 384 is not removable from the base 326. The retainer 384 is moveable relative to the base 326 between a non-retaining position (see FIG. 20) and a retaining position (see FIG. 21). In the non-retaining position, the retainer 384 is disengaged from the inner pressurization structure 354 such that the inner pressurization structure 354 can be moved relative to the base 326. Also, when the retainer 384 is in the non-retaining position of FIG. 20, the retainer 384 interferes with the ability to fit the dome 324 on the base 326. Therefore, the retainer 384 prevents a technician from mounting the dome 324 to the base 326 before the inner pressurization structure 354 has been fixed relative to the base 326. When the retainer 384 is slid relative to the base 326 to the retaining position of FIG. 21 while the sealing unit 330 is fully inserted within the base 326, the retainer 384 slides within slots (see FIG. 23) defined by the inner pressurization structure 354 such that the inner pressurization structure 354 is prevented from moving along the central axis 341 by the retainer 384.

To load the insert assembly 328 within the housing 322, the insert assembly 328 is initially inserted through the base 326 until the sealing unit 330 is housed within the base 326. Next, the retainer 384 is moved from the non-retaining position of FIG. 20 to the retaining position of FIG. 21 such that the inner pressurization structure 354 of the actuation arrangement 352 is fixed relative to the base 326. Thereafter, the handle 366 can be threaded in the first direction about the threaded actuator shaft 368 to pressurize the sealant ring 350 thereby forming seals about cables routed through the cable ports 332 and forming the inner and outer radial seals 351, 353. The dome 324 can then be fitted to the base 326 and secured in place by the latches 348. As so configured, the frame 334 and the telecommunications components 336 are positioned within the dome 324. The telecommunications enclosure 320 can be re-entered without disturbing the sealing unit 330 by unlatching the latches 348 and removing the dome 324 from the base 326. A technician can then access the telecommunications components 336 on the frame 334 for servicing, maintenance, upgrades or other servicing needs. If desired, the retainer 384 can be removed to the non-retaining position and the inert assembly 328 can be pulled out from the outer end 342 of the base 326.

Figure 25:
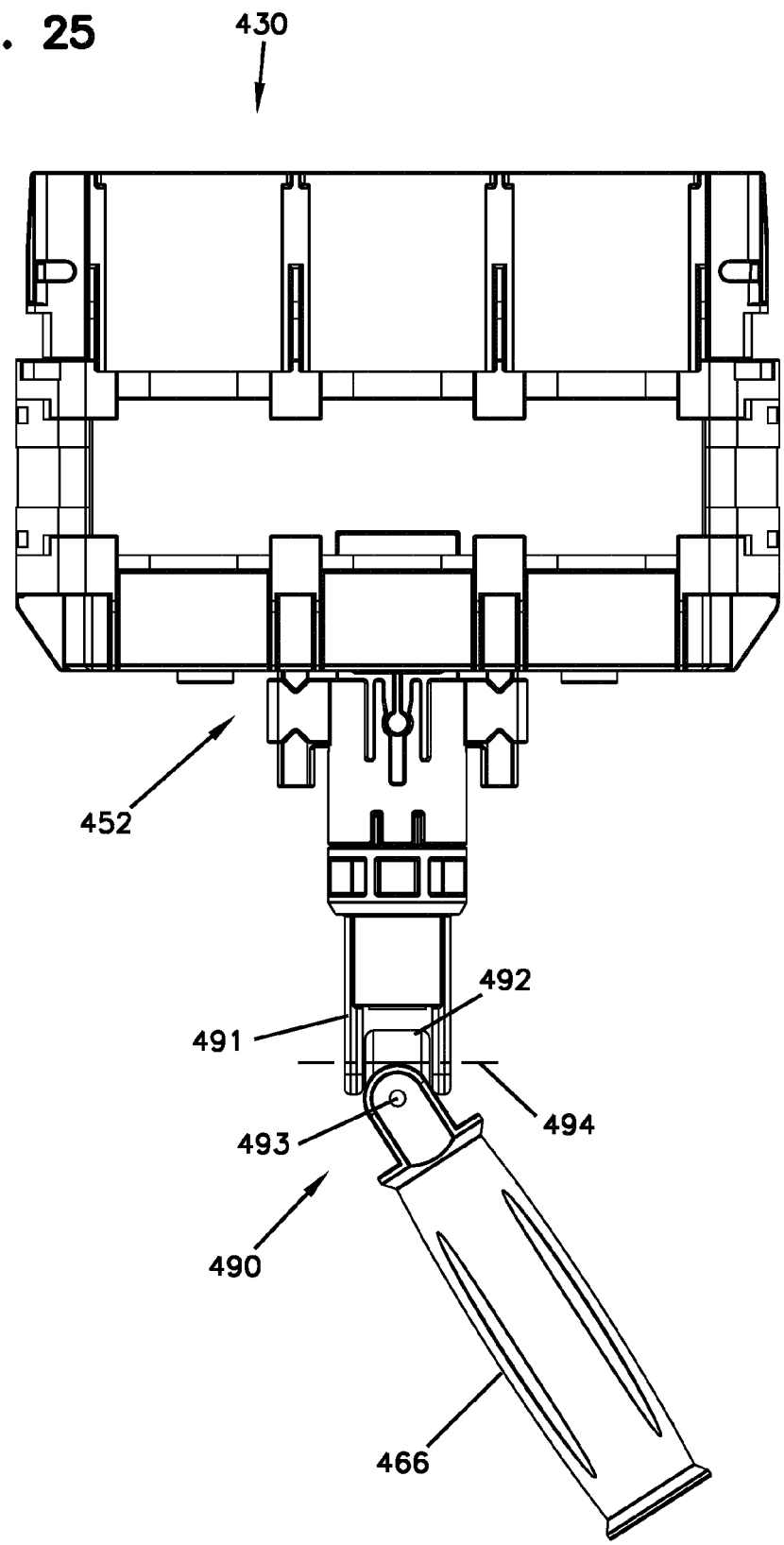
FIG. 25 is a top view of still another sealing unit in accordance with the principles of the present disclosure, the sealing unit has an actuator handle assembly having a universal pivot arrangement.
Figure 26:
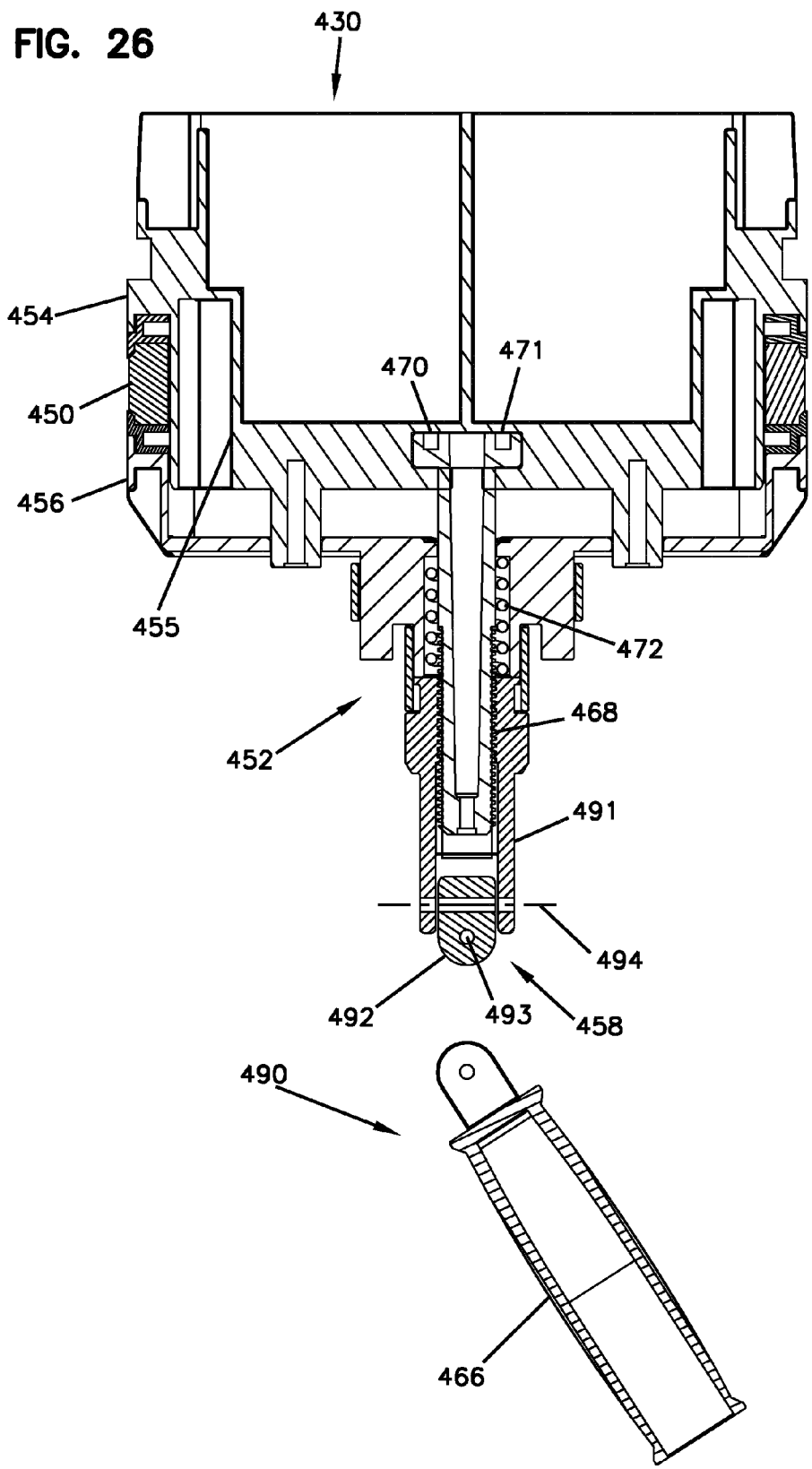
FIG. 26 is a cross-sectional view of the sealing unit of FIG. 25.

FIGS. 25 and 26 show another sealing unit 430 in accordance with the principles of the present disclosure. The sealing unit 430 includes a sealant ring 450 that can be of the type previously described herein. The sealing unit 430 includes an actuation arrangement 452 for pressurizing the sealant ring 450 thereby causing the sealant ring 450 to form seals around cables routed through cable ports defined by the sealant ring 450. The actuation arrangement 452 includes inner and outer axial pressurization structures 454, 456 between which the sealant ring 450 is positioned. The inner and outer axial pressurization structures 454, 456 can be of the type previously described herein. The actuation arrangement 452 includes an actuator 458 for forcing the inner and outer axial pressurization structures 454, 456 together to pressurize the sealant ring 450. The actuator 458 includes a handle assembly 490 that is mounted on a threaded shaft 468. An inner end 470 of the threaded shaft 468 is secured to an outer axial extension 455 of the inner axial pressurization structure 454 at an anchoring location 471. The threaded shaft 468 is mounted so as to not rotate relative to the inner pressurization structure 454. The handle assembly 490 includes a base 491 that is threaded on the threaded shaft 468 and a handle 466 that can be universally pivoted relative to the base 491. The handle 466 is pivotally connected to an intermediate link 492 at a first pivot axis 493. The intermediate link 492 is pivotally connected to the base 491 at a second pivot axis 494. The first and second pivot axes 493, 494 are perpendicular relative to one another. In this way, the handle 466 can be universally pivoted relative to the base 491 and the threaded shaft 468 on which the base 491 is threaded. A spring 472 is positioned axially between the base 491 and the outer pressurization structure 456. The spring 472 is positioned around the threaded shaft 468. By manually turning the handle 466 in a first rotational direction about its central axis, the base 491 is threaded onto the threaded shaft 468 causing the base 491 to compress the spring 472 axially against the outer axial side of the outer axial pressurization structure 456 thereby causing the inner and outer axial pressurization structures 454, 456 to be forced together such that the sealant ring 450 between the inner and outer axial pressurization structures 454, 456 is pressurized. By turning the handle 466 about its central longitudinal axis in a second rotational direction, the base 491 is unthreaded from the threaded shaft 468 thereby allowing the spring 472 to decompress thereby depressurizing the sealant ring 450. The ability to universally pivot the handle 466 is advantageous particularly when many cables have been routed into the enclosure thereby making access to the handle 466 difficult. The universal pivot allows the handle 466 to be pivoted out from the cables routed to the enclosure thereby providing access to the handle 466 and allowing the actuation arrangement 452 to be easily pressurized and/or depressurized. In certain examples, the handle 466 can be detached from the intermediate link 492 by removing a pivot pin that extends along the first pivot axis 493. Typically, the handle 466 would be disconnected from the intermediate link 492 after the actuation arrangement 452 has been fully pressurized. In this way, the overall assembly occupies less space. Moreover, the absence of the handle 466 deters an unauthorized person from depressurizing the sealant unit 430.

It will be appreciated that various materials can be used to form the sealant arrangement. Example materials include elastomers, including natural or synthetic rubbers (e.g., EPDM rubber or silicone rubber). In other embodiments, polymeric foam (e.g., open cell or closed cell) such as silicone foam can be used. In still other embodiments, the sealing members may comprise gel and/or gel combined with another material such as an elastomer. The gel may, for example, comprise silicone gel, urea gel, urethane gel, thermoplastic gel, or any suitable gel or geloid sealing material. Gels are normally substantially incompressible when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other embodiments, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). The sealing members can also include additives such as moisture scavengers, antioxidants, tackifiers, pigments and/or fungicides. In certain embodiments, sealing members in accordance with the principles of the present disclosure have ultimate elongations greater than 100 percent with substantially elastic deformation to an elongation of at least 100 percent. In other embodiments, sealing members in accordance with the principles of the present disclosure have ultimate elongations of at least 200 percent, or at least 500 percent, or at least 1000 percent. Ultimate elongation can be determined by the testing protocol set forth at ASTM D412.

From the forgoing detailed description, it will be evident that modifications and variations can be made without departing from the spirit and scope of the disclosure.

LIST OF REFERENCE NUMERALS AND CORRESPONDING FEATURES 20 enclosure
22 housing
24 end
25 clamp
26 sealing unit opening
27 base
28 sealing unit
29 cover
30 cable ports
30a-30f cable ports
31 actuation arrangement
32 sealant arrangement
33a-33f cable sealing modules
35 actuator
36 lever arms
41 major axis
52 spring
60 inner pressurization structure
62 outer pressurization structure
64 cam surfaces
70 first axial end
72 second axial end
74 volume of sealant
74a, 74b half-parts of sealant
76 first axial containment structure
76a, 76b first half-parts of axial containment structure
78 second axial containment structure
78a, 78b second half-parts of axial containment structure
79 conical parts
80 cable sealing surfaces
84 outer sealing surface
90 body
94 body axis
94 openings
96 engagement portions
102 receptacles
106 fiber optic cables
170 actuator shaft
190 frame
192 optical components
320 telecommunications enclosure
322 housing
324 dome
326 base
328 insert assembly
330 sealing unit
332 plurality of cable ports
334 frame
336 telecommunications components
338 mounting bracket
339 interior cable anchoring structure
340 main opening
341 central axis
342 outer end
344 inner end
346 open end
347 inner radial surface
348 latches
349 outer radial surface
350 sealant ring
351 outer radial seal
352 actuation arrangement
353 inner radial seal
354 inner axial pressurization structures
355 outer axial extension
356 outer axial pressurization structures
357 open chamber
358 actuator
360 axial inner side
362 axial outer side
366 handle
368 threaded actuator shaft
370 inner end
371 anchoring location
372 spring
373 fixed nut
374 exterior cable anchoring structure
376 cable anchoring plates
378 bridge plate
380 cable tie-down locations
382 exterior fastening sections
384 retainer
430 sealing unit
450 sealant ring
452 actuation arrangement
454 inner axial pressurization structure
455 outer axial extension
456 outer axial pressurization structure
458 actuator
466 handle
468 threaded shaft
470 inner end
471 anchoring location
472 spring
490 handle assembly
491 base
492 intermediate link
493 first pivot axis 494 second pivot axis
L total axial length
L1 first axial length
L2 second axial length
P1 non-actuated position
P2 actuated position
S1 axial spacing
S2 axial spacing

What is claimed is:

1. An enclosure comprising:
a housing having an end defining a sealing unit opening;
a sealing unit that fits within the sealing unit opening, the sealing unit including a sealant arrangement that defines a plurality of cable ports, the sealant arrangement also being configured for providing a peripheral seal between the housing and the sealing unit, the sealing unit also including an actuation arrangement for pressurizing the sealant arrangement within the sealing unit opening, the actuation arrangement including inner and outer pressurization structures between which the sealant arrangement is positioned, the actuation arrangement including a spring for applying a pressurization force that causes the sealant arrangement to be pressurized between the inner and outer pressurization structures when the actuation arrangement is actuated, the sealant arrangement including a plurality of sealing modules each sized to form only a portion of the pressure actuated sealant arrangement, the sealing modules being individually installable between the inner and outer pressurization structures and being individually removable from between the inner and outer pressurization structures, each sealing module having a total axial length that extends between first and second axial ends of the sealing module along a central axis of the sealing module, the sealing modules each including a volume of sealant at least partially contained between first and second axial containment structures, the first and second axial containment structures forming the first and second axial ends of the sealing modules, the volumes of sealant each including cable sealing surfaces that extend around and define the cable ports, the volumes of sealant each also including exposed outer sealing surfaces that surround peripheries of the sealing modules;
wherein the sealant arrangement includes at least three of the sealing modules; and
wherein portions of the exposed outer sealing surfaces cooperate to form the peripheral seal between the housing and the sealing unit.

2. The enclosure of claim 1, wherein the sealant arrangement includes at least four of the sealing modules.

3. The enclosure of claim 1, wherein the sealant arrangement includes at least five of the sealing modules.

4. The enclosure of claim 1, wherein the sealant arrangement includes at least six of the sealing modules.

5. The enclosure of claim 1, wherein the sealing modules define two rows of cable ports, wherein the sealant arrangement is elongated along a major axis, and wherein the rows extend along the major axis, and wherein the sealing modules include lateral end sealing modules that are spaced-apart from one another along the major axis, and wherein intermediate sealing modules are positioned between the lateral end sealing modules.

6. The enclosure of claim 1, wherein the first and second axial containment structures of the cable sealing modules define containment structure openings that align with the cable ports.

7. The enclosure of claim 1, wherein the volumes of sealant of the sealing modules each include at least first and second sealing parts that can be separated to allow for lateral cable insertion into the sealing modules, and wherein the first and second axial containment structures of the sealing modules each include first and second containment parts corresponding to the first and second sealing parts.

8. The enclosure of claim 1, wherein the first and second axial containment structures are configured to respectively interlock with first and second pressurization structures of the actuation arrangement.

9. The enclosure of claim 1, wherein the first and second axial containment structures define receptacles for receiving corresponding projections provided on first and second pressurization structures of the actuation arrangement.

10. The enclosure of claim 1, wherein engagement portions of the first and second pressurization structures overlap the first and second axial containment structures of the sealing modules.

11. The enclosure of claim 1, wherein the first and second axial containment structures are attached to the volumes of sealant.

12. The enclosure of claim 1, wherein the enclosure is a kit and the sealing modules have different port configurations such that an end user can select different sealing modules from the plurality of sealing modules to accommodate different cabling needs.

13. The enclosure of claim 1, wherein the first axial containment structures are outer axial containment structures and the second axial containment structures are inner axial containment structures, wherein the inner pressurization structure includes retention portions that engage and axially and radially overlap with the inner axial containment structures, and the outer pressurization structure includes retention portions that engage and axially and radially overlap with the outer axial containment structures.

14. The enclosure of claim 1, wherein the sealing modules are axially and radially contained by the inner and outer axial pressurization structures.

15. The enclosure of claim 13, wherein the actuation arrangement is movable to a fully de-actuated position, and wherein an axial overlap exists between the retention portions of the inner and outer pressurization structures and the inner and outer axial containment structures when the actuation arrangement is in the fully de-actuated position such that the sealing modules are retained between the inner and outer pressurization structures.

16. An enclosure comprising:
a housing defining a housing opening that extends along an opening central axis;
a sealing unit that is inserted along the opening central axis into the housing opening, the sealing unit including a sealant ring that surrounds the opening central axis when the sealing unit is positioned within the opening, the sealing unit including an actuation arrangement having inner and outer axial pressurization structures between which the sealant ring is axially pressurized, the sealant ring forming an outer radial seal with an interior surface of the housing that defines the housing opening, the sealant ring forming an inner radial seal with an outward axial extension of the inner pressurization structure, the actuation arrangement also including an actuator accessible from outside the housing, the actuator including an actuator shaft that couples to the outward axial extension of the inner pressurization structure.

17. The enclosure of claim 16, wherein the outward axial extension of the inner pressurization structure defines a hollow interior chamber around which the sealant ring extends.

18. The enclosure of claim 16, further comprising a retainer for axially fixing the inner pressurization structure relative to the housing.

19. The enclosure of claim 18, further comprising an exterior cable anchoring structure secured to the outward axial extension of the inner pressurization structure.

20. The enclosure of claim 19, further comprising an interior cable anchoring structure secured to the inner pressurizations structure.

21. The enclosure of claim 16, wherein the actuator includes an exterior handle coupled to the actuator shaft and a spring, wherein the exterior handle is actuated to compress the spring and cause the inner and outer pressurization structures to pressurize the sealant ring.

22. The enclosure of claim 21, wherein the shaft is threaded and the exterior handle is actuated by threading the exterior handle on the threaded shaft to compress the spring.

23. The enclosure of claim 21, wherein the shaft is threaded, wherein the exterior handle is part of a handle assembly having a base that is threaded on the actuator shaft, wherein the exterior handle is universally pivotally moveable relative to the base, and wherein the base is threaded onto the actuator shaft by turning the handle about a central longitudinal axis of the handle, and wherein the base compresses the spring when the base is threaded onto the actuator shaft.

24. The enclosure of claim 16, wherein the sealant ring is formed by a plurality of separate cable sealing modules.

25. The enclosure of claim 24, wherein each cable sealing module includes a volume of sealant positioned between inner and outer axial containment structures, wherein the inner axial containment structures correspond to the inner axial pressurization structure and the outer axial containment structures correspond to the outer axial pressurization structure, and wherein the outer axial containment structures interlock with the outer axial pressurization structure and the inner axial containment structures interlock with the inner axial pressurization structure.

26. The enclosure of claim 24, wherein each cable sealing module includes a volume of sealant positioned between inner and outer axial containment structures, wherein the inner axial containment structures correspond to the inner axial pressurization structure and the outer axial containment structures correspond to the outer axial pressurization structure, and wherein the inner axial pressurization structure includes portions that engage and axially and radially overlap with the inner axial containment structures, and the outer axial pressurization structure includes portions that engage and axially and radially overlap with the outer axial containment structures.

27. The enclosure of claim 24, wherein each cable sealing module includes a volume of sealant positioned between inner and outer axial containment structures, wherein the inner axial containment structures correspond to the inner axial pressurization structure and the outer axial containment structures correspond to the outer axial pressurization structure, and wherein the cable sealing modules are axially and radially contained by the inner and outer axial pressurization structures.

28. The enclosure of claim 16, wherein the housing includes a dome that attaches to a base, and wherein the housing opening is defined by the base.

29. The enclosure of claim 28, further comprising a retainer for securing the inner pressurization structure relative to the base.

30. The enclosure of claim 29, wherein the retainer is a U-shaped retainer that is slidable relative to the base between a retaining position and a non-retaining position.

31. A sealing unit comprising:
a sealant ring;
inner and outer axial pressurization structures for pressurizing the sealant ring;
an actuator for forcing the inner and outer axial pressurization structures together to pressurize the sealant ring, the actuator including a threaded shaft and a handle assembly that threads on the threaded shaft to press the inner and outer pressurization structures together, the handle assembly including a handle that is universally pivotally movable relative to the threaded shaft.

32. The sealing unit of claim 31, wherein the handle assembly includes a base threaded on the threaded shaft, an intermediate link pivotally connected to the base at a first pivot axis, wherein the handle is pivotally connected to the intermediate link at a second pivot axis, and wherein the first and second pivot axes are perpendicular relative to one another.

33. An enclosure comprising:
a housing having an end defining a sealing unit opening;
a sealing unit that fits within the sealing unit opening, the sealing unit including a sealant arrangement that defines a plurality of cable ports, the sealant arrangement also being configured for providing a peripheral seal between the housing and the sealing unit, the sealing unit also including an actuation arrangement for pressurizing the sealant arrangement within the sealing unit opening, the actuation arrangement including inner and outer pressurization structures between which the sealant arrangement is axially positioned, the actuation arrangement including a spring for applying an axial pressurization force that causes the sealant arrangement to be pressurized between the inner and outer pressurization structures when the actuation arrangement is actuated, the sealant arrangement including a plurality of sealing modules each sized to form only a portion of the pressure actuated sealant arrangement, the sealing modules being individually installable between the inner and outer pressurization structures and being individually removable from between the inner and outer pressurization structures, the cable ports being fully defined within the removable sealing modules, the sealing modules including volumes of sealant at least partially axially contained between first and second axial containment structures, the volumes of sealant including cable sealing surfaces that extend around the cable ports so as to define the cable ports, the volumes of sealant also including exposed outer sealing surfaces that surround peripheries of the sealing modules;
wherein the sealant arrangement includes at least three of the sealing modules; and
wherein portions of the exposed outer sealing surfaces cooperate to form the peripheral seal between the housing and the sealing unit.

34. The enclosure of claim 33, wherein the sealing modules are formed by bodies that are individually installable between the inner and outer pressurization structures and are individually removable from between the first and second pressurization structures, the bodies having wrap-around configurations for allowing cables to be laterally inserted into the cable ports.

35. The enclosure of claim 33, wherein the volumes of sealant of the sealing modules are in fluid communication with one another when assembled together to form the sealing arrangement and are collectively pressurized between the first and second pressurization structures when the actuation arrangement is actuated.

* * * * *